(12) United States Patent
Thubert et al.

(10) Patent No.: US 11,057,211 B2
(45) Date of Patent: Jul. 6, 2021

(54) SECURED PROTECTION OF ADVERTISEMENT PARAMETERS IN A ZERO TRUST LOW POWER AND LOSSY NETWORK

(71) Applicant: Cisco Technology, Inc., San Jose, CA (US)

(72) Inventors: Pascal Thubert, La Colle sur Loup (FR); Huimin She, Shanghai (CN); Patrick Wetterwald, Mouans Sartoux (FR); Akram Ismail Sheriff, San Jose, CA (US); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 247 days.

(21) Appl. No.: 16/214,318

(22) Filed: Dec. 10, 2018

(65) Prior Publication Data
US 2020/0186349 A1    Jun. 11, 2020

(51) Int. Cl.
*H04L 9/32* (2006.01)
*H04L 29/12* (2006.01)
*H04L 9/30* (2006.01)
*G06F 16/901* (2019.01)

(52) U.S. Cl.
CPC ........ *H04L 9/3213* (2013.01); *G06F 16/9024* (2019.01); *H04L 9/30* (2013.01); *H04L 9/3247* (2013.01); *H04L 9/3271* (2013.01); *H04L 61/2007* (2013.01)

(58) Field of Classification Search
CPC . H04L 9/0894; H04L 9/30; H04L 9/32; H04L 9/3213; H04L 9/3247; H04L 9/3271; H04L 63/08; H04L 63/0876; H04L 63/126; H04L 63/1425; H04L 63/1466; H04L 61/2007
See application file for complete search history.

(56) References Cited

U.S. PATENT DOCUMENTS

| 9,510,347 B2 | 11/2016 | Thubert et al. | |
| 2010/0030695 A1* | 2/2010 | Chen | H04W 12/08 705/67 |

(Continued)

OTHER PUBLICATIONS

Perry et al. "TRAIL: Topology Authentication in RPL" [Online], Dec. 15, 2015 [Retrieved on: Feb. 22, 2021], Cornell University, Retrieved from: < https://arxiv.org/pdf/1312.0984 > (Year: 2015).*
(Continued)

*Primary Examiner* — Eric W Shepperd
(74) *Attorney, Agent, or Firm* — Leon R. Turkevich

(57) ABSTRACT

In one embodiment, a method comprises: receiving, by a parent network device providing at least a portion of a directed acyclic graph (DAG) according to a prescribed routing protocol in a low power and lossy network, a destination advertisement object (DAO) message, the DAO message specifying a target Internet Protocol (IP) address claimed by an advertising network device in the DAG and the DAO message further specifying a secure token associated with the target IP address; and selectively issuing a cryptographic challenge to the DAO message to validate whether the advertising network device generated the secure token.

20 Claims, 12 Drawing Sheets

(56) References Cited

U.S. PATENT DOCUMENTS

| | | | |
|---|---|---|---|
| 2012/0084565 A1* | 4/2012 | Wittenberg | H04L 9/3234 713/172 |
| 2012/0300668 A1* | 11/2012 | Thubert | H04L 41/0803 370/254 |
| 2015/0222439 A1* | 8/2015 | Bhattacharya | H04L 9/0869 713/169 |
| 2016/0197829 A1* | 7/2016 | Thubert | H04L 47/20 370/392 |
| 2016/0269188 A1* | 9/2016 | Thubert | H04L 45/02 |
| 2017/0273002 A1 | 9/2017 | Chen et al. | |
| 2018/0103036 A1* | 4/2018 | Fox | H04W 12/069 |
| 2019/0036896 A1* | 1/2019 | Khushu | H04L 9/3271 |
| 2019/0068382 A1* | 2/2019 | Theodore | H04L 9/321 |
| 2019/0138753 A1* | 5/2019 | Wallrabenstein | H04L 9/3278 |
| 2019/0288939 A1* | 9/2019 | Dong | H04L 45/021 |
| 2019/0289463 A1* | 9/2019 | Glouche | H04W 12/069 |
| 2020/0021586 A1* | 1/2020 | Schmidt | H04L 63/10 |
| 2020/0059784 A1* | 2/2020 | Batra | H04W 12/041 |
| 2020/0145409 A1* | 5/2020 | Pochuev | H04L 63/061 |

OTHER PUBLICATIONS

Alabsi et al., "A Comprehensive Review on Security Attacks in Dynamic Wireless Sensor Networks based on RPL protocol", [online], International Journal of Pure and Applied Mathematics, vol. 118, No. 20, 2018, [retrieved on Oct. 15, 2018]. Retrieved from the Internet: URL: <https://www.researchgate.net/publication/324756841_A_Comprehensive_Review_on_Security_Attacks_in_Dynamic_Wire>, pp. 1-17.

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf.org/pdf/draft-ietf-6lo-ap-nd-06.pdf>, pp. 1-22.

Winter, Ed., et al., "RPL: IPv6 Routing Protocol for Low power and Lossy Networks", [online], ROLL Internet Draft, Feb. 4, 2011, [retrieved on Oct. 15, 2018]. Retrieved from the Internet: URL: <https://tools.ietf.org/html/draft-ietf-roll-rpl-18>, pp. 1-159.

Thubert, Ed., "Routing for RPL Leaves", [online], ROLL Internet Draft, May 23, 2018, [retrieved on Oct. 30, 2018]. Retrieved from the Internet: URL: <https://tools.ietf.org/pdf/draft-thubert-roll-unaware-leaves-05.pdf>, pp. 1-17.

Arkko, Ed., et al., "SEcure Neighbor Discovery (SEND)", [online], Network Working Group, Request for Comments: 3971, Mar. 2005, [retrieved on Oct. 30, 2018]. Retrieved from the Internet: URL: <https://tools.ietf.org/pdf/rfc3971.pdf>, pp. 1-56.

Aura, "Cryptographically Generated Addresses (CGA)", [online], Network Working Group, Request for Comments: 3972, Mar. 2005, [retrieved on Oct. 30, 2018]. Retrieved from the Internet: URL: <https://tools.ietf.org/pdf/rfc3972.pdf>, pp. 1-22.

Narten et al., "Neighbor Discovery for IP version 6 (IPv6)", [online], Network Working Group, Request for Comments: 4861, Sep. 2007, [retrieved on Nov. 28, 2018]. Retrieved from the Internet: URL: <https://tools.ietf.org/pdf/rfc4861.pdf>, pp. 1-97.

Winter, Ed., et al., "RPL: IPv6 Routing Protocol for Low-Power and Lossy Networks", [online], Internet Engineering Task Force (IETF), Request for Comments: 6550, Mar. 2012, [retrieved on Oct. 30, 2018]. Retrieved from the Internet: RL: <https://tools.ietf.org/pdf/rfc6550.pdf>, pp. 1-157.

Shelby, Ed., et al., "Neighbor Discovery Optimization for IPv6 over Low-Power Wireless Personal Area Networks (6LoWPANs)", [online], Internet Engineering Task Force (IETF), Request for Comments: 6775, Nov. 2012, [retrieved on Oct. 30, 2018]. Retrieved from the Internet: URL: <https://tools.ietf.org/pdf/rfc6775.pdf>, pp. 1-55.

Tsao et al., "A Security Threat Analysis for the Routing Protocol for Low-Power and Lossy Networks (RPLs)", [online], Internet Engineering Task Force (IETF), Request for Comments: 7416, Jan. 2015, [retrieved on Oct. 15, 2018]. Retrieved from the Internet: URL: <https://pdfs.semanticscholar.org/9fd7/6255b3127f4301dc1065b3dabcd3c83adec4.pdf?_ga=2.143257781.1817885558.1539332928-19233707.1525674069>, pp. 1-41.

Thubert, Ed., et al., "Registration Extensions for IPv6 over Low-Power Wireless Personal Area Network (6LoWPAN) Neighbor Discovery", [online], Internet Engineering Task Force (IETF), Request for Comments: 8505, Nov. 2018, [retrieved on Nov. 16, 2018]. Retrieved from the Internet: <https://tools.ietf.org/pdf/rfc8505.pdf>, pp. 1-47.

Wikipedia, "Public-key cryptography", [online], Nov. 9, 2018, [retrieved on Nov. 16, 2018]. Retrieved from the Internet: URL: <https://en.wikipedia.org/w/index.php?title=Public-key_cryptography&pri>, pp. 1-15.

Kent, "Securing the Border Gateway Protocol", [online], Sep. 2003, The Internet Protocol Journal, vol. 6, No. 3, [retrieved on Dec. 7, 2018]. Retrieved from the Internet: URL: <https://www.cisco.com/c/en/us/about/press/internet-protocol-journal/back-issues/table-contents-25/securing-bgp-s-bgp.html>, pp. 1-10.

Bellovin, "SBGP—Secure BGP", [online], Jun. 3, 2003, [retrieved on Dec. 7, 2018]. Retrieved from the Internet: URL: <https://www.nanog.org/meetings/nanog28/presentations/bellovinsbgp.pdf>, pp. 1-8.

\* cited by examiner

RPL-ENABLED

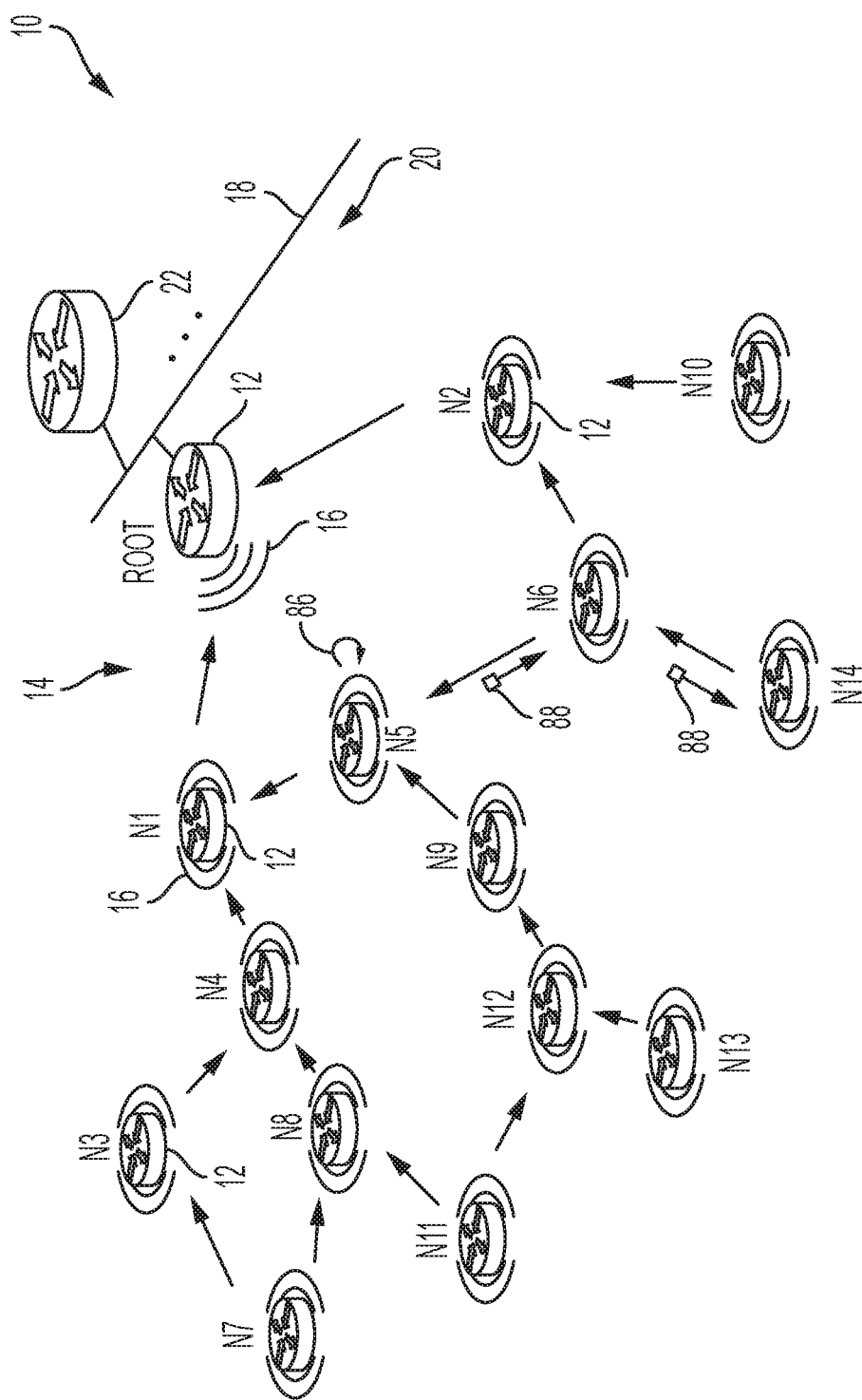
FIG. 1C (RPL-ENABLED)

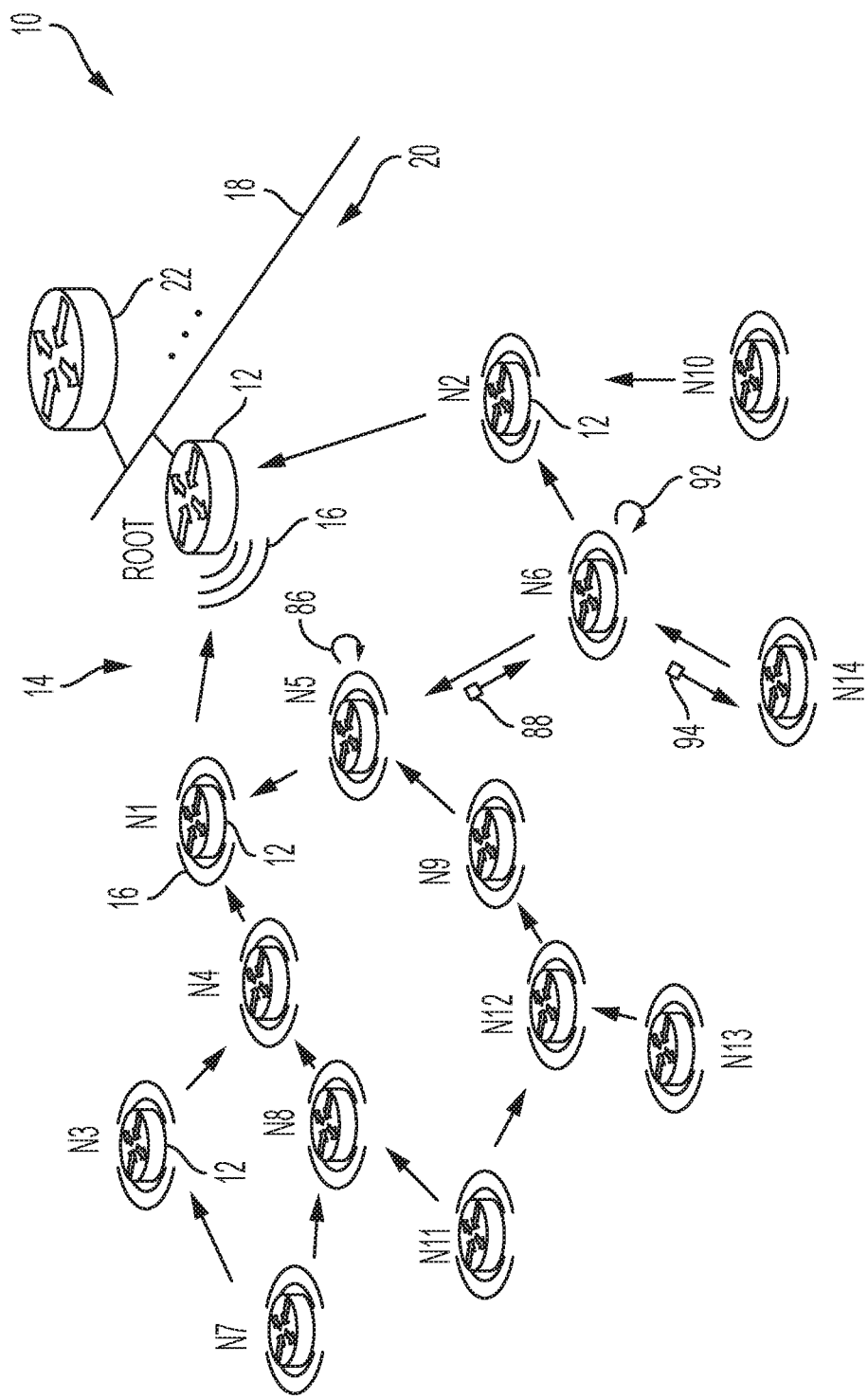
FIG. 1D (NON-RPL ENABLED)

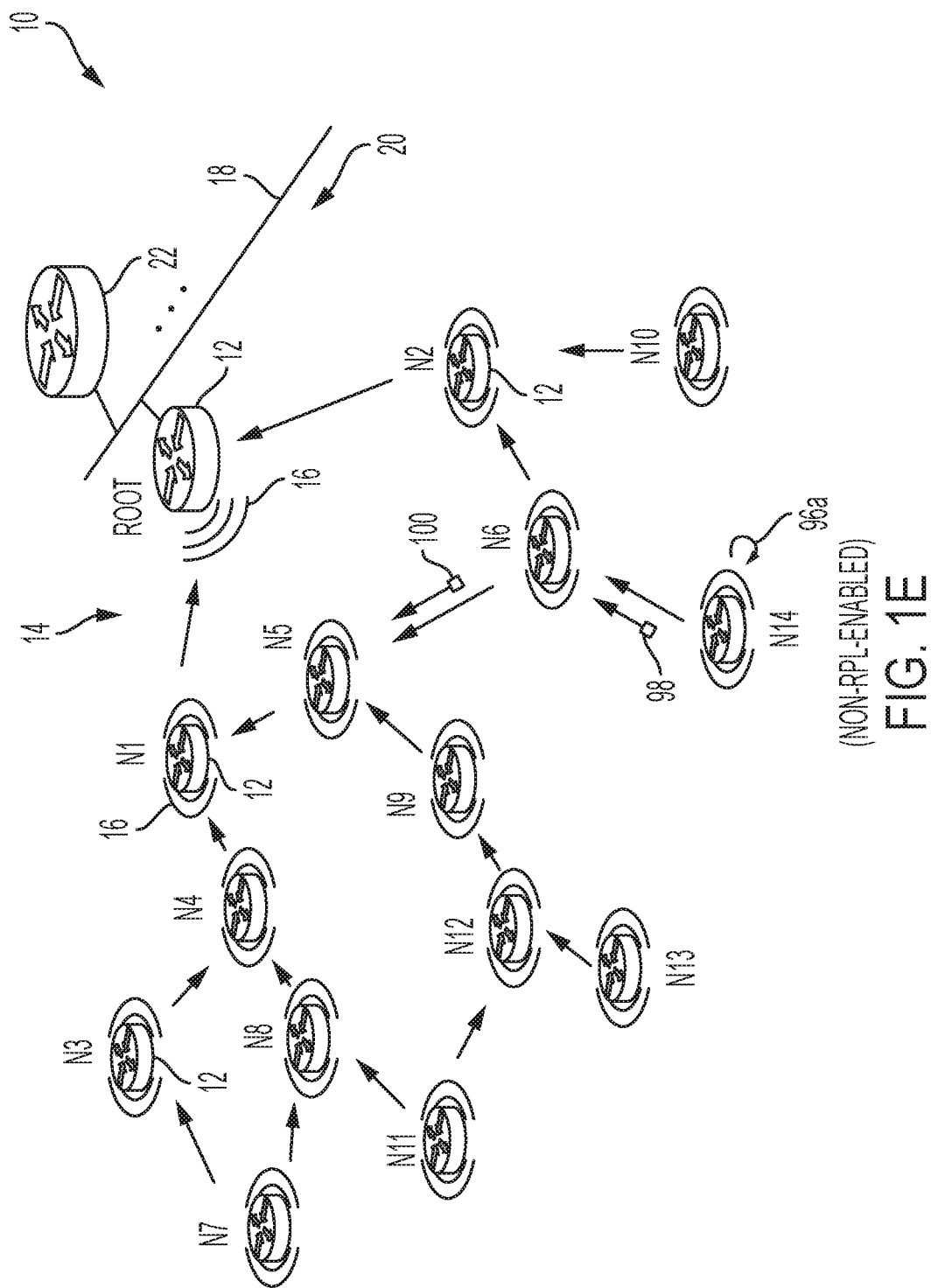
FIG. 1E (NON-RPL-ENABLED)

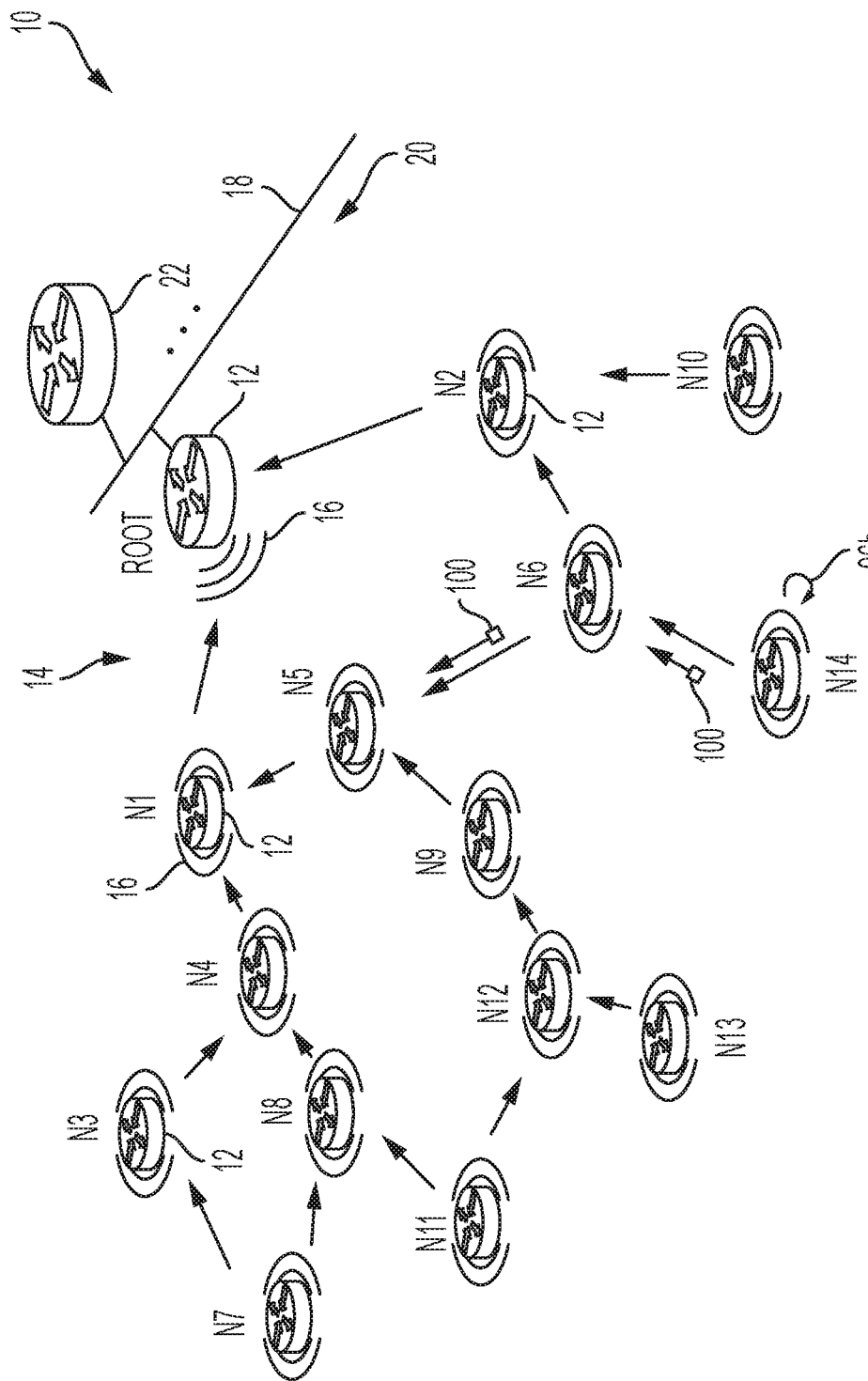
FIG. 1F (RPL-ENABLED)

SECURED PROTECTION OF ADVERTISEMENT PARAMETERS IN A ZERO TRUST LOW POWER AND LOSSY NETWORK

TECHNICAL FIELD

The present disclosure generally relates to secured protection of advertisement parameters in a zero trust low power and lossy network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

Downward routes (i.e., away from the DAG root) can be created based on Destination Advertisement Object (DAO) messages that are created by a RPL node and propagated toward the DAG root. The RPL instance implements downward routes in the DAG of the LLN in either a storing mode only (fully stateful), or a non-storing mode only (fully source routed by the DAG root). In storing mode, a RPL node unicasts its DAO message to its parent node, such that RPL nodes store downward routing table entries for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Existing proposals for securing a RPL network fail to address scenarios where an attacking network device is able to gain access to the secured RPL network, for example in cases where the attacking network device obtains a security key used within the RPL network.

BRIEF DESCRIPTION OF THE DRAWINGS

Reference is made to the attached drawings, wherein elements having the same reference numeral designations represent like elements throughout and wherein:

FIGS. 1A-1F illustrates an example system having an apparatus for selectively issuing a cryptographic challenge to a destination advertisement object (DAO) message in a low power and lossy network, according to an example embodiment.

DESCRIPTION OF EXAMPLE EMBODIMENTS

Overview

Figure 1A:
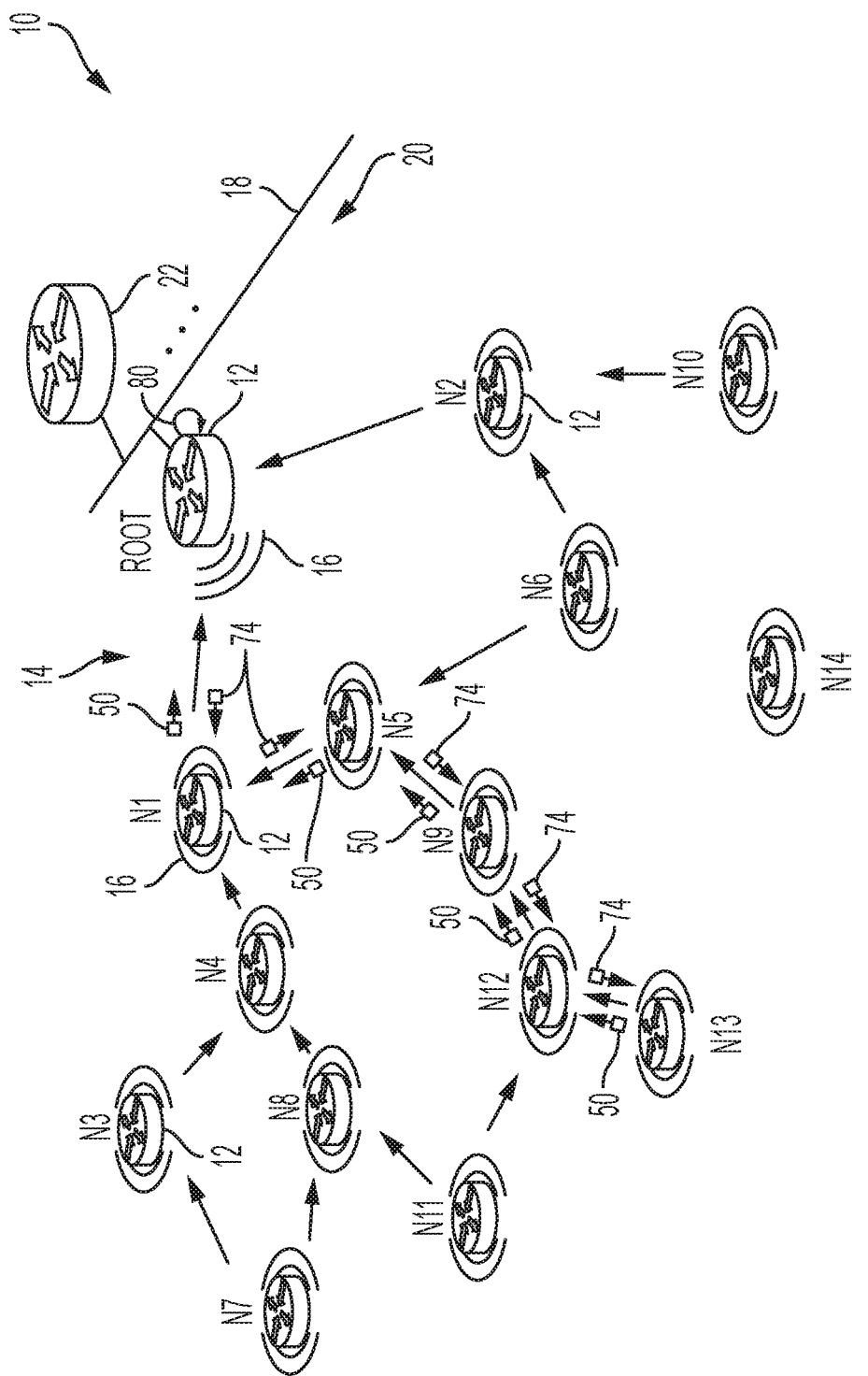
Figure 1B:
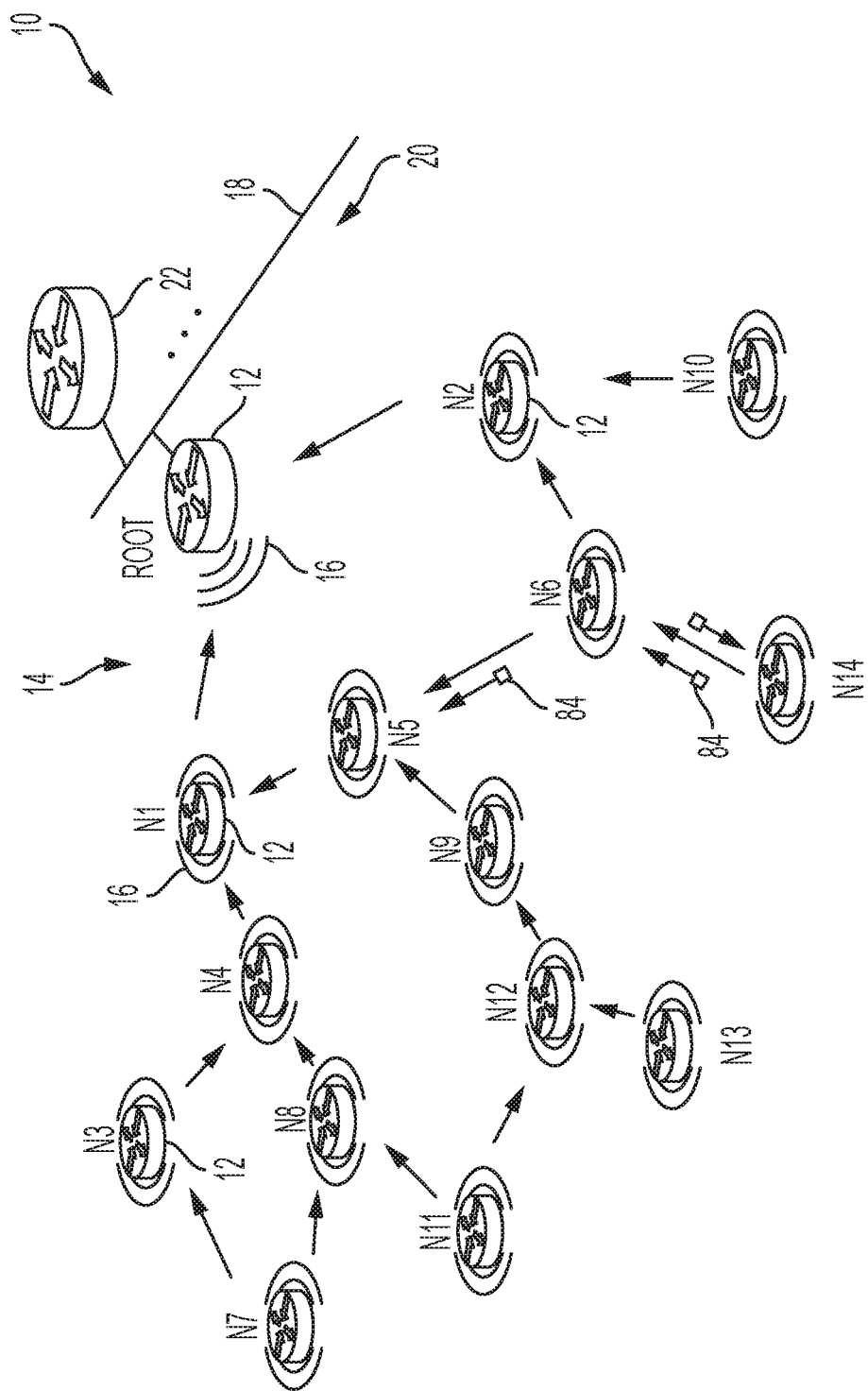

In one embodiment, a method comprises receiving, by a parent network device providing at least a portion of a directed acyclic graph (DAG) according to a prescribed routing protocol in a low power and lossy network, a destination advertisement object (DAO) message, the DAO message specifying a target Internet Protocol (IP) address claimed by an advertising network device in the DAG and the DAO message further specifying a secure token associated with the target IP address; and selectively issuing a cryptographic challenge to the DAO message to validate whether the advertising network device generated the secure token.

In another embodiment, an apparatus is implemented as a physical machine and comprises non-transitory machine readable media configured for storing executable machine readable code, a device interface circuit, and a processor circuit. The device interface circuit is configured for receiving a destination advertisement object (DAO) message in a low power and lossy network, the apparatus implemented as a parent network device providing at least a portion of a directed acyclic graph (DAG) according to a prescribed routing protocol in the low power and lossy network. The processor circuit is configured for executing the machine readable code. The processor circuit, when executing the machine readable code is operable for: determining the DAO message specifies a target Internet Protocol (IP) address claimed by an advertising network device in the DAG, and that the DAO message further specifies a secure token associated with the target IP address; and selectively issuing a cryptographic challenge to the DAO message to validate whether the advertising network device generated the secure token.

In another embodiment, one or more non-transitory tangible media are encoded with logic for execution by a machine and when executed by the machine operable for: receiving, by the machine implemented as a parent network device providing at least a portion of a directed acyclic graph (DAG) according to a prescribed routing protocol in a low power and lossy network, a destination advertisement object (DAO) message, the DAO message specifying a target Internet Protocol (IP) address claimed by an advertising network device in the DAG and the DAO message further specifying a secure token associated with the target IP address; and selectively issuing a cryptographic challenge to the DAO message to validate whether the advertising network device generated the secure token.

DETAILED DESCRIPTION

Particular embodiments provide a scalable protection of RPL nodes in a RPL network from unauthorized network devices or attacking network devices that attempt to gain access within the RPL network, or that attempt to claim RPL network parameters of other RPL network devices. The particular embodiments provide scalable protection of the RPL nodes based on utilizing secure tokens generated using private cryptographic keys owned by the respective RPL nodes, without the reliance of computation-intensive encryption techniques that are not suitable for constrained low power and lossy network devices.

In one example embodiment, a RPL root network device (and/or a common parent in the DAG, described below), can selectively issue a cryptographic challenge to a DAO message associated with an advertising network device, regardless of whether the DAO message was already originated by a RPL parent device providing an attachment to the advertising network device for communications within the DAG. The DAO message propagated within the DAG also can include a secure token associated with the target IP address claimed by the advertising network device in the DAG: any RPL parent device can validate whether the advertising network device owns the secure token based on the RPL parent device obtaining one or more parameters used to build the secure token (including, for example, a public cryptographic key), and receiving a cryptographic data structure ("signature") responsive to the cryptographic challenge that proves the advertising network device owns the private cryptographic key that corresponds to the public cryptographic key used to build the secure token.

As described in further detail below, the above-described example embodiment can protect the target IP address in the DAO message in a scalable manner that can be implemented by constrained low-power RPL nodes, even without the necessity of securing the DAO message by encrypting the target IP address as described in the Internet Engineering Task Force (IETF) Request for Comments (RFC) 6550, and without the reliance on the computationally-expensive operation of generating cryptographic addresses (as described in RFC 3971, entitled "Secure Neighbor Discovery (SEND)").

Moreover, since the above-described example embodiment can protect the target IP address in the DAO message without encrypting the target IP address as described in RFC 6550, the above-described example embodiment can protect the target IP address in the DAO message without the necessity of sharing any link-local cryptographic key, or without the necessity of sharing any network-wide cryptographic key that could risk exposing the LLN (e.g., a CG-Mesh based electric grid) to an unauthorized network device (e.g., a consumer intelligent washing machine at a subscriber premises); further, the above-described embodiment can still protect the target IP address, even if an unauthorized network device were to gain access to the link-local cryptographic key or any network-wide cryptographic key, because the example embodiments can protect the target IP address based on issuing a challenge that requires an advertising device to prove it owns the associated secure token.

As described in further detail below, the above-described example embodiment also enables the secure token to be associated with a plurality of network addresses that can be used by the advertising network device, since a parent network device (e.g., the root network device) can store and maintain a state of network addresses (e.g., from multiple DAO messages) utilized by the advertising network device and associated with the same secure token, where the advertising network device can prove (if requested) that it owns each address associated with the secure token.

Hence, the above-described example provides a scalable and effective secured protection of the target address using a secure token in a DAG message, where the secure token is associated with the target IP address, and based on selective issuance of a cryptographic challenge to the DAO message to prove that the advertising network device owns the private cryptographic key associated with generating the secure token.

In another embodiment, a RPL root network device can execute protected DODAG information object (DIO) messages based on generating cryptographic signatures of DIO parameters, according to an example embodiment. The RPL root network device generates a unique cryptographic signature for each DIO message that is transmitted in the RPL network, ensuring that no network device gaining link layer access to the RPL network can attack the RPL network by advertising an unauthorized rank.

Secured Protection of Target Address in Destination Advertisement Object (DAO) Message FIGS. 1A-1F illustrate an example data network 10 comprising multiple network devices 12 configured for establishing a tree-based network topology 14, for example a Directed Acyclic Graph (DAG) or a Destination Ordered DAG (DODAG), according to an example embodiment. Each of the network devices (e.g., "Root", "N1" through "N14") 12 can be configured for forming a DAG network topology 14 via wired or wireless data links 16, for example according to RPL as specified in the IETF RFC 6550. Each network device 12 also can be implemented as a constrained RPL device, described previously as constrained by processing power, memory, energy (e.g., battery power), and/or constrained data links 16 (e.g., high loss rates, low data rates, low packet delivery rates, etc.).

Each of the network devices (e.g., "N1 through "N14") 12 can be attached to at least one of another network device 12 or a root network device "ROOT" 12 via wireless data links 16 that form a link layer mesh topology. Although only the network devices "ROOT", "N1", "N2", and "N3" are labeled with the reference numeral "12" in the Figures to avoid cluttering in the Figures, it should be apparent that all the network devices "N1" through "N14" are allocated the reference numeral "12" for purposes of the description herein. Further, it should be apparent that all the network devices "N1" through "N14" 12 can be configured for establishing wireless data links 16 (illustrated as curved lines radiating from each device 12), even though only the wireless data links for the network device "N1" 12 and the root network device "ROOT" 12 are labeled with the reference numeral "16" to avoid cluttering in the Figures. Any one of the network devices 12 also can be attached to one or more root network devices (not shown), for example where a plurality of root network devices can be connected via a wired data link 18 to form a "backbone" network 20 comprising one or more backbone routers 22 for the data network 10.

Each attachment in the DAG topology 14 is illustrated by an one-way arrow "→" where the corresponding child network device is positioned at the tail end of the arrow, and the corresponding parent network device is positioned at the arrowhead end of the arrow, such that the root network device "ROOT" 12 is the parent for the directly-attached child network devices "N1" and "N2", the network device "N1" is the parent for the directly-attached child network devices "N4" and "N5", etc.

As described previously, the DAG topology 14 can be established by the network devices 12 overlying a link layer mesh based on the network devices 12 exchanging routing protocol messages according to a prescribed routing protocol, for example RFC 6550, entitled "RPL: IPv6 Routing Protocol for Low-Power and Lossy Networks". A child network device (e.g., "N13") 12 can attach to a potential parent device (e.g., "N12") 12 in response to detecting a DIO message advertised by the potential parent device (e.g., "N12") and specifying updated network topology metrics relative to a DIO message originated by the root network device "ROOT" 12. A Destination Advertisement Object (DAO) message can be created by an advertising RPL node (e.g., "N13") 12 in response to attaching as a child to a parent network device (e.g., "N12"): the DAO message generated by the advertising RPL network device can be propagated via its parent network device (e.g., "N12") toward the DAG root network device "ROOT" 12; as described in RFC 6550, the DAO message can specify "target" IP address or prefix (e.g., an IPv6 address or prefix utilized by the child RPL node "N13"), enabling the root network device "ROOT" 12 to establish a downward path for reaching the advertising network device.

A fundamental problem is that existing proposals for securing a RPL network fail to provide a scalable solution where constrained network devices 12 operating as RPL parents can execute a routing protocol within the DAG topology 14 that can protect against attacks by an unauthorized or attacking network device (e.g., "N14") that has improperly acquired a link-layer cryptographic key or a network-wide cryptographic key. In particular, RFC 6550 specifies at Section 6.1 that any secure RPL control message (e.g., a secure DIO, a secure DAO, etc.) (FIG. 7 of RFC 6550) requires encryption of all fields starting at the first byte after the Security section and continuing to the last byte of the packet; hence, RPL 6550 requires that all data fields following the security section (including the Target option specifying the target address in a secure DAO message as in Section 6.4.2) are encrypted.

Hence, the deployment of a secure RPL control message as proposed in RFC 6550 is not scalable and not practical for deployment in a LLN because it requires a RPL device attempting to process a secure RPL control message (e.g., a secure DAO message, secure DIO message, etc.) to decrypt each and every secure RPL control message: such processing requirements for secure RPL control messages can greatly overwhelm the processing capacity of network devices 12, especially in the case of the root network device "ROOT" 12 or parent network devices near the network device 12 (e.g., "N1", "N2", "N5") that are near the root network device "ROOT" 12 in the DAG topology 14 and that may need to process a large number of RPL control messages.

Further, the deployment of a secure RPL control message as proposed in RFC 6550 assumes that a node wishing to join a secured network has been pre-configured with a shared key for communicating with neighbors and the RPL root (see, e.g., Sec. 9.2); hence, the secured RPL network as proposed in RFC 6550 can be compromised if an unauthorized/attacking network device "N14" 12 is able to acquire the shared key.

Hence, the proposed secure RPL network control message as proposed in RFC 6550 is not scalable for providing a secured protection of advertisement messages for a routing protocol used to establish a network layer routing topology (e.g., the DAG topology 14) in a low power and lossy network, where "zero trust" is desired to prevent an unauthorized/attacking network device "N14" 12 from improperly gaining access to the DAG topology 14.

Neighbor discovery protocols are separate and distinct from routing protocols, in that neighbor discovery protocols enable a host network device to claim a valid network address for communication with a neighboring network device in a data network; however, neighbor discovery protocols have no involvement in the establishment of a network layer routing topology beyond the link layer connection between the neighboring network devices, as the network discovery protocols are confined to registration of an IP address between a host network device (e.g., a leaf network device) and its neighboring network device (e.g., a router attached within a network layer topology in a data network according to a prescribed routing protocol). For example, RFC 6775, entitled "Neighbor Discovery Optimization for IPv6 over Low-Power Wireless Personal Area Networks (6LoWPANs)," describes addressing mechanisms (e.g., neighbor discovery, duplicate address detection, address registration) for low-power wireless personal area networks, for example between a 6LoWPAN device at an edge of a 6LoWPAN network and a new network device attempting to join the 6LoWPAN network; the Internet Draft by Thubert et al., "Address Protected Neighbor Discovery for Low-power and Lossy Networks" (hereinafter "AP-ND Draft") extended 6LoWPAN Neighbor Discovery (ND) as described in RFC 6775 by enabling a 6LowPAN Node (6LN) to protect its address by generating a crypto identifier, and permitting the neighboring 6LoWPAN Router (6LR) at the edge of a 6LoWPAN network and providing a link layer connection with the 6LN to issue a challenge to have the 6LN verify it is the owner of the crypto identifier associated with the address; the Internet Draft by Thubert, "Routing for RPL Leaves" enables a RPL-unaware leaf device (e.g., 6LN) to request its neighboring RPL-enabled router to register the AP-ND protected address of the of the RPL-unware leaf device on behalf of the RPL-unaware leaf device, eliminating the necessity that the leaf device be aware of the RPL protocol; and RFC 8505, entitled "Registration Extensions for IPv6 over Low-Power Wireless Personal Area Network (6LoWPAN) Neighbor Discovery", supports the registration of the RPL-unaware leaf device using registration verification between the RPL-unaware leaf device and the RPL-enabled router providing the link layer connection to the RPL-unaware leaf device.

Hence, existing routing protocols such as RFC 6550 are directed to creating a network topology for constrained devices, whereas the above-described neighbor discovery protocols are confined to registering addresses of leaf network devices that are joining an existing network topology.

As described previously, RPL routers in a RPL-based DAG topology were assumed (e.g., according to RFC 6550) to have a shared level of trust, and therefore cannot provide the desired "zero trust" level of security to counter the risk that an unauthorized/attacking network device "N14" 12 obtaining a shared network-cryptographic key could risk exposing the data network (e.g., a CG-Mesh grid). Further, the existing neighbor discovery protocols in combination with routing protocols (e.g., RFC 6550), as illustrated in RFC 8505, do not provide a sufficient balance between security and flexibility. In particular, the above proposals fail to address a problem in preventing a first case where two separate leaf network devices (e.g., "6LN1" and "6LN2") each securely connect to different RPL routers (e.g., "6LN1" connected to "N6" and "6LN2" connected to "N12") at separate and distinct locally-administered domains (e.g., "N6" at subscriber premises "Family X" and "N12" at separate and distinct subscriber premises "Family Y"), and the two separate leaf network devices attempt to securely claim the same IP address. The above proposals also fail to address permitting a second case where a single leaf network device "6LN1" having first securely registered its IP address via the RPL router "N12" at premises "Family Y" can later securely update its registration via the RPL router "N6" after the leaf network device "6LN" having moved to the subscriber premises "Family X".

According to example embodiments, the routing protocol described herein enables protection of a target IP address in a DAO message without encrypting the target IP address as described in RFC 6550, based on relying on the DAO specifying a secure token associated with the target IP address claimed by the advertising network device. Any RPL parent network device in the DAG topology 14 (e.g., in storing mode) can selectively issue a cryptographic challenge to the DAO message, for example in response to determining the target IP address claimed by the advertising network device is already in use, requiring the advertising network device having generated the secure token to prove that it owns the private key associated with generation of the secure token.

Hence, the example embodiments can guarantee protection of the target IP address associated with the secure token, even if the unauthorized/attacking network device "N14" 12 is able to detect the DAO message and the target IP address and associated secure token in the DAO message, since any RPL parent network device issuing the cryptographic challenge (including, for example, a nonce value chosen by the RPL parent network device) can require that the cryptographic challenge (e.g., the nonce value) be signed using the private key, enabling the RPL parent network device to determine whether any cryptographic key is validated (e.g., using a public key associated with the private key used to generate the secure token).

The example embodiments also provide scalable protection, since the advertising network device (and not the RPL parent network device) is required to respond to the cryptographic challenge. Further, a RPL parent device can discard a public key once the response to the cryptographic challenge and/or the secure token has been validated by the RPL parent device. Further, the same secure token can be used for multiple IP addresses used by the same advertising network device, enabling a storing RPL parent network device (or the root network device "ROOT" 12) to store in its route table entries the secure token and the one or more IP addresses validated as associated with the secure token.

Figure 2:
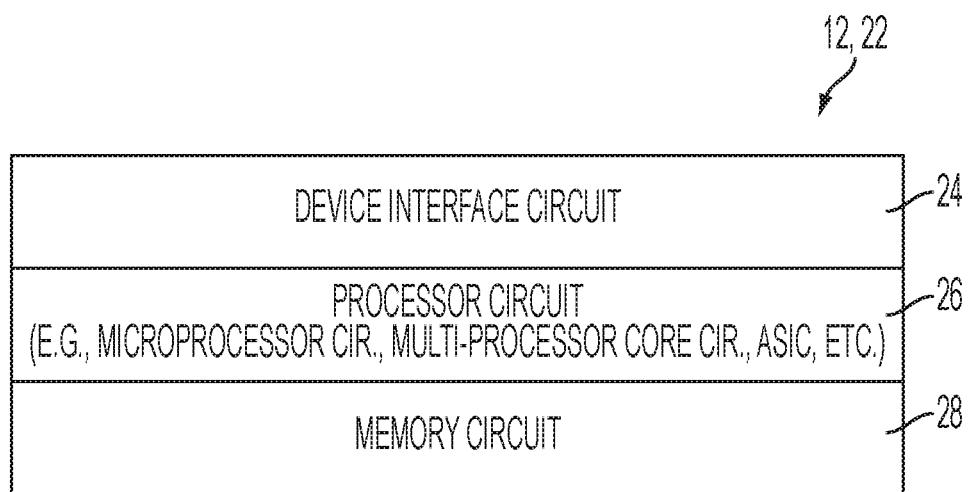
FIG. 2 illustrates an example implementation of any one of the network devices of FIGS. 1A-1F, according to an example embodiment.

FIG. 2 illustrates an example implementation of any one of the devices 12, 22, of FIGS. 1A-1F, according to an example embodiment. Each apparatus 12, 22 is a physical machine (i.e., a hardware device) configured for implementing network communications with other physical machines 12 via the data network 10. The term "configured for" or "configured to" as used herein with respect to a specified operation refers to a device and/or machine that is physically constructed and arranged to perform the specified operation.

Each apparatus 12, 22 can include a device interface circuit 24, a processor circuit 26, and a memory circuit 28. The device interface circuit 24 can include one or more distinct physical layer transceivers for communication with any one of the other devices 12, 22; the device interface circuit 24 also can include an IEEE based Ethernet transceiver for communications with the devices of FIG. 1 via any type of data link (e.g., a wired or wireless link, an optical link, etc.). The processor circuit 26 can be configured for executing any of the operations described herein, and the memory circuit 28 can be configured for storing any data or data packets as described herein.

Any of the disclosed circuits of the devices 12, 22 (including the device interface circuit 24, the processor circuit 26, the memory circuit 28, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 28) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 28 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 28 can be implemented dynamically by the processor circuit 26, for example based on memory address assignment and partitioning executed by the processor circuit 26.

Figure 3A:
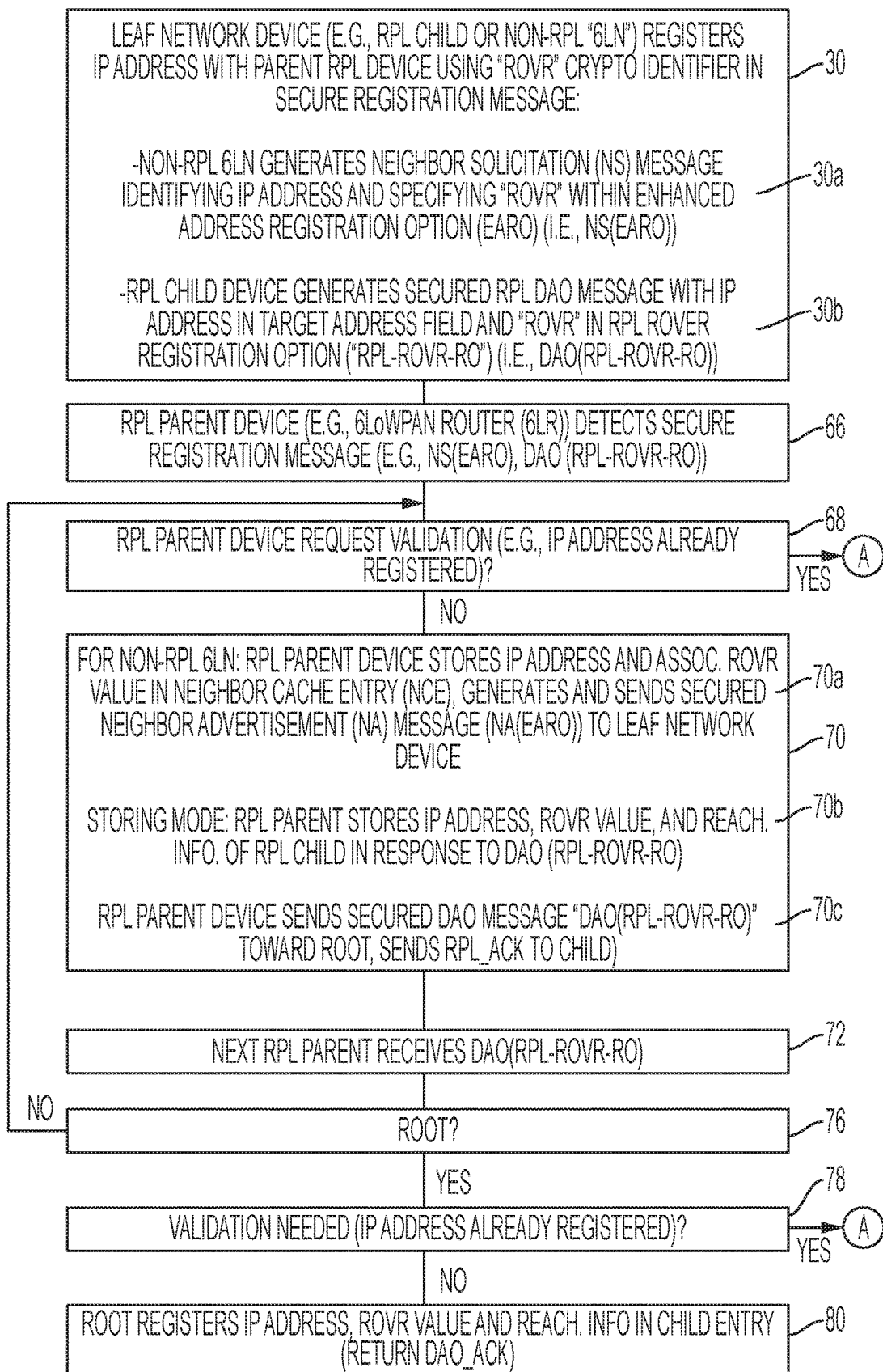
FIGS. 3A-3C summarize an example method in the system of FIGS. 1A-1F of protecting a target Internet Protocol (IP) address claimed by an advertising network device based on selectively issuing a cryptographic challenge to a DAO message, according to an example embodiment.
Figure 3B:
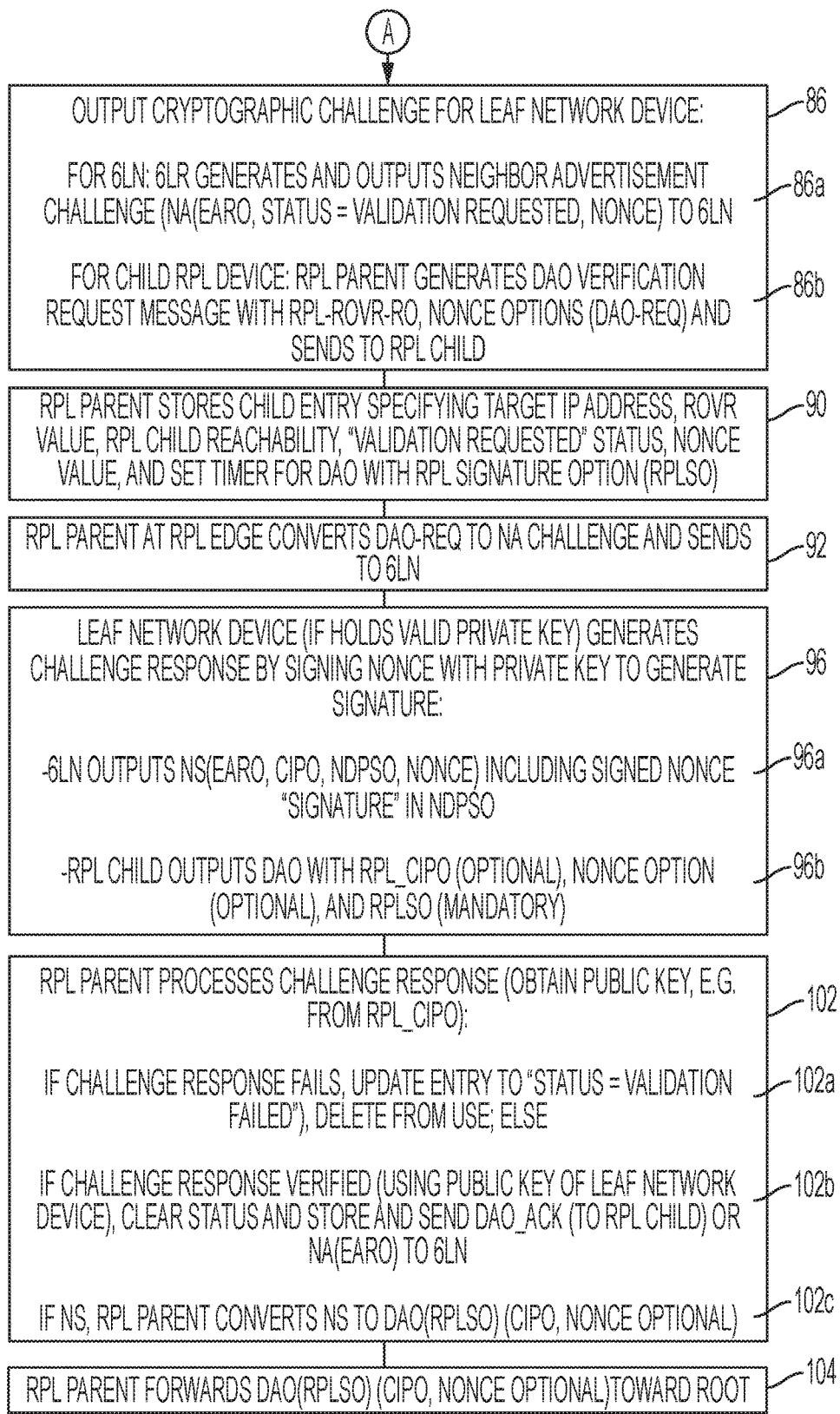
Figure 3C:
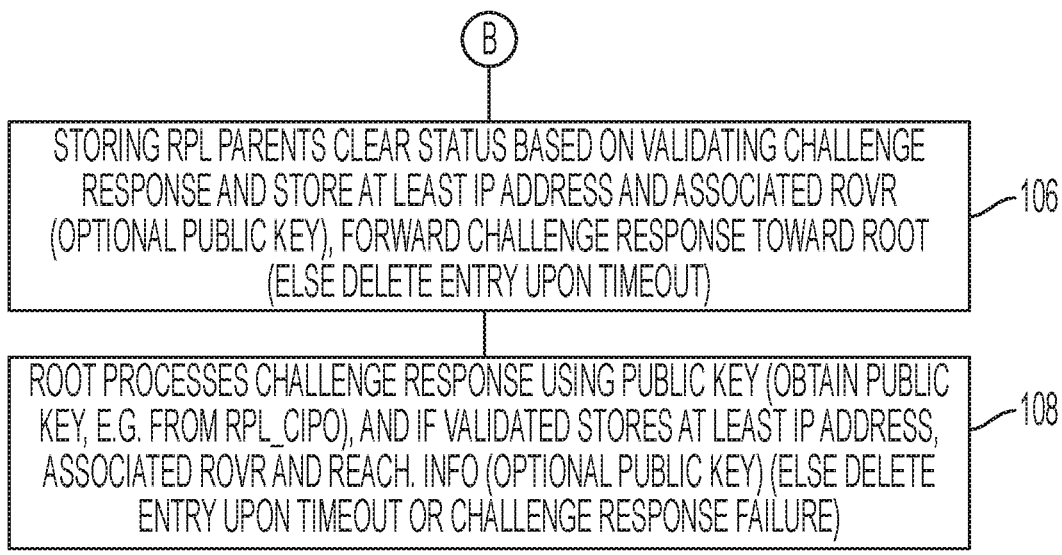

FIGS. 3A-3C summarize an example method in the system of FIGS. 1A-1F of protecting a target Internet Protocol (IP) address claimed by an advertising network device based on selectively issuing a cryptographic challenge to a DAO message, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 1A and FIG. 3A, a leaf network device (e.g., the advertising network device "N13" 12) in operation 30 can request secure registration of its IP address with its parent RPL device "N12" 12 based on generating in operation 30 a secure token (32 of FIG. 4), also referred to as a Registration Ownership Verifier ("ROVR"). In particular, each network device 12 in the DAG topology 14 can be configured for secure operations in the data network 10 based on each network device 12 being exclusively allocated a corresponding private/public cryptographic key pair comprising a private secure key "Kprv" 34 and a corresponding public secure key "Kpub" 36: the private key "Kprv" 34 is always kept secret by the network device 12 that owns the private key "Kprv" 34, whereas the corresponding public key "Kpub" 36 (e.g., a DER-encoded public key) can be shared with other network devices 12 for validation of the "ROVR" secure token 32 and validation of cryptographic challenges, described below. In one embodiment, Elliptic Curve Cryptography (ECC) can be used for generating the private key "Kprv" 34 and corresponding public key "Kpub" 36 to reduce transmission and storage requirements.

Figure 4:
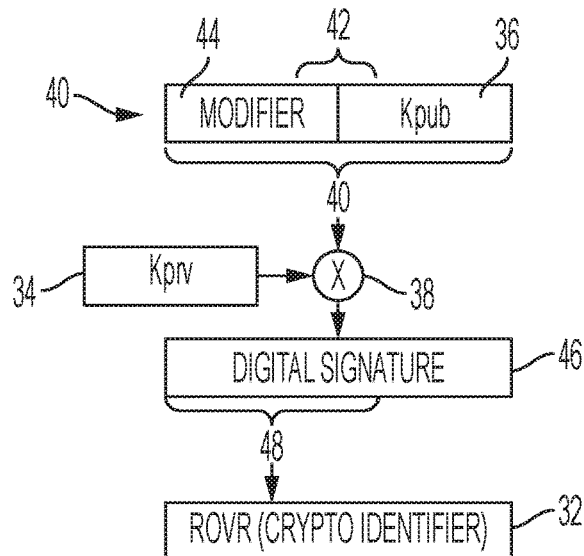
FIG. 4 illustrates an example generation of the secure token, according to an example embodiment.

As illustrated in FIG. 4, the processor circuit 26 of an advertising network device "N13" 12 in operation 30 can generate the "ROVR" secure token 32 for the network device 12 based on executing a cryptographic operation 38 on a dynamically-generated data structure 40 using the corresponding private key "Kprv" 34. In particular, the processor circuit 26 of the advertising network device "N13" 12 can dynamically generate the dynamically-generated data structure 40 based on dynamically generating a modifier value (e.g., pseudorandom, 8-bit) "MODIFIER" 44, and executing a concatenation operation 42 of the modifier value "MODIFIER" 44 with the public key "Kpub" 36. The cryptographic operation 38 can be executed on the dynamically-generated data structure 40 using the private key "Kprv" 34, resulting in a digital signature 46. The processor circuit 26 of the advertising network device "N13" 12 in operation 48 can select a prescribed number of the left-most bits of the digital signature 46 (e.g., 64 or more bits) as the "ROVR" secure token 32. Additional details regarding generating the "ROVR" secure token 32 are found in Section 4.2 of the AP-ND Draft.

Referring to operation 30a of FIG. 3A, if the advertising network device "N13" 12 is implemented as a non-RPL device, the processor circuit 26 of the advertising network device "N13" 12 can generate a neighbor solicitation (NS) message specifying the host IP address used by the advertising network device "N13" 12 and that includes an Extended Address Registration Option (EARO), i.e., an "NS(EARO) message": the EARO option can include the "ROVR" secure token 32 and a transaction identifier (TID) that serves as a sequence counter; the device interface circuit 24 of the advertising network device "N13" 12 can output the NS(EARO) message to its parent network device "N12" 12 for secure registration of the host IP address.

Figure 5:
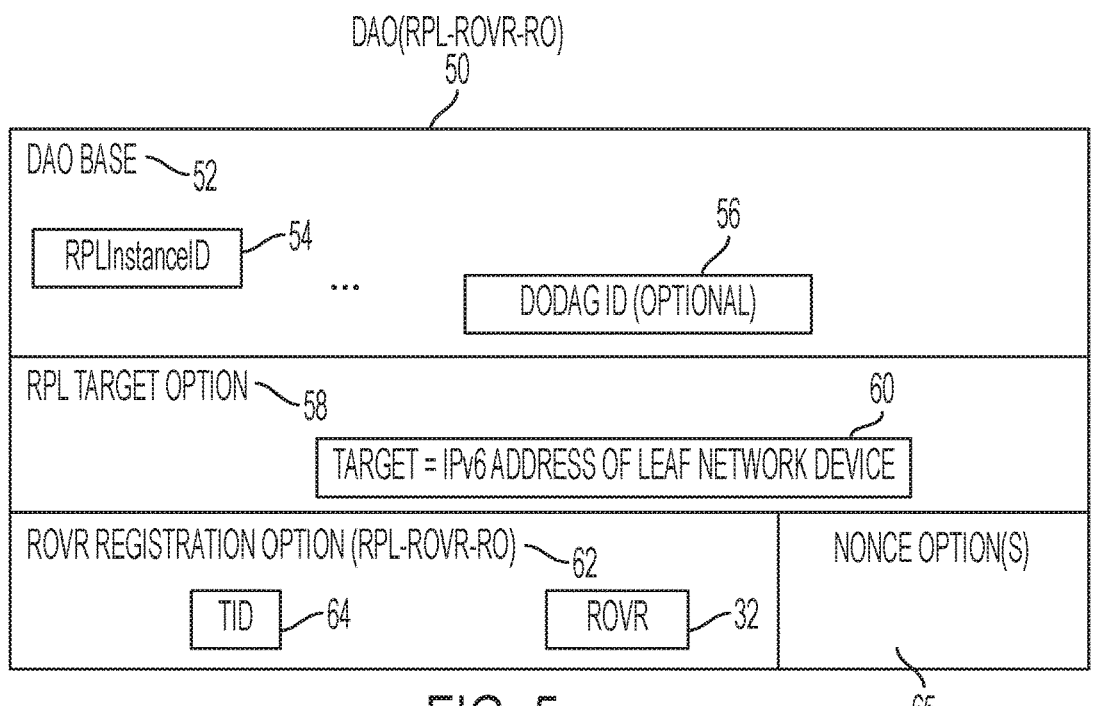
FIG. 5 illustrates an example DAO message comprising a target IP address and a secure token associated with the target IP address, according to an example embodiment.

If the advertising network device "N13" 12 is implemented as a RPL-enabled device, the processor circuit 26 of the advertising network device "N13" 12 can generate in operation 30b a protected DAO message "DAO(RPL-ROVR-RO)" 50, illustrated in FIG. 5. As illustrated in FIG. 5, the protected DAO message "DAO(RPL-ROVR-RO)" 50 comprises a DAO Base object 52 that can include a RPL Instance identifier 54, an optional DODAG identifier 56, and other parameters (not shown). The protected DAO message "DAO(RPL-ROVR-RO)" 50 also can include a RPL Target Option 58 that can include the IPv6 address 60 of the advertising network device "N13" 12 as the target value according to RFC 6550 (the target value 60 also can specify an IP address prefix claimed by the advertising network device "N13" 12). The protected DAO message "DAO (RPL-ROVR-RO)" 50 also can include a ROVR registration option 62 that specifies the "ROVR" secure token 32, and that further specifies a transaction identifier (TID) 64, and a nonce option 65 that can specify one or more nonce values, described below. The device interface circuit 24 of the RPL-enabled advertising network device "N13" 12 in operation 30b can output the protected DAO message "DAO (RPL-ROVR-RO)" 50 to its RPL parent network device "N12" 12.

The device interface circuit 24 of the RPL parent network device "N12" 12 that provides a connection to the leaf network device, i.e., the advertising network device "N13" 12, in operation 66 can receive a secure registration message either in the form of a "NS(EARO)" message from a non-RPL device (e.g., a "6LN") device, or in the form of the above-described protected DAO message "DAO(RPL- ROVR-RO)" 50. Depending on configuration of the RPL parent network device "N12" 12, the processor circuit 26 of the RPL parent network device "N12" 12 can decide in operation 68 whether it needs to request validation of the received secure registration message: in one embodiment, the RPL parent network device "N12" 12 can decide that no validation or cryptographic challenge is needed if the IP address claimed by the advertising network device "N13" 12 in the "NS(EARO)" message or the protected DAO message "DAO(RPL-ROVR-RO)" 50 is a new address that is not previously registered.

Assuming in operation 68 that the processor circuit 26 of the parent network device "N12" 12 determines no registration is needed (e.g., the IP address claimed in the secure registration message has not yet been registered), the processor circuit 26 of the parent network device "N12" 12 in operation 70 can process the received secure registration message, as appropriate. In one example, the processor circuit 26 of the parent network device "N12" 12 in operation 70*a* can respond to a received "NS(EARO)" message from a non-RPL device by storing the IPv6 address (or prefix) and associated ROVR value in a neighbor cache entry (NCE); the processor circuit 26 of the parent network device "N12" 12 in operation 70*a* also can respond to the "NS(EARO)" message by sending a secured neighbor advertisement message "NA(EARO)" to the non-RPL leaf network device.

In another example, the processor circuit 26 of the parent network device "N12" 12 in operation 70*b* in storing mode can respond to a received protected DAO message "DAO(RPL-ROVR-RO)" 50 by creating in its memory circuit 28 a child entry that specifies the IPv6 address 60 specified in the RPL Target Option 58, the "ROVR" secure token 32, and the corresponding reachability information (e.g., link layer identifier, attachment address, etc.).

The processor circuit 26 of the parent network device "N12" 12 in operation 70*c* can generate the protected DAO message "DAO(RPL-ROVR-RO)" 50 on behalf of a non-RPL leaf node, if necessary, based on extracting the "ROVR" secure token 32, the TID, and the IP address from the "NS(EARO)" message, inserting the extracted IP address into the target IP address field 60 of the RPL Target Option 58, inserting the extracted TID into the transaction identifier (TID) field 64 of the ROVR registration option 62, and inserting the extracted "ROVR" secure token 32 into the ROVR registration option 62. The device interface circuit 24 of the parent network device "N12" 12 in operation 70*c* can output the protected DAO message "DAO(RPL-ROVR-RO)" 50 (generated by the parent network device "N12" 12 on behalf of a non-RPL leaf device or forwarded based on reception thereof from a RPL-enabled advertising network device "N13" 12) to its corresponding parent network device "N9" 12. As illustrated in FIG. 3A, the processor circuit 26 of the parent network device "N12" 12 in operation 70*c* also can generate and send a DAO acknowledgement message 74 (e.g., secured using the "ROVR" secure token 32) to the RPL-enabled advertising network device "N13" 12.

The next RPL parent device (e.g., "N9") 12 can respond to receiving in operation 72 the protected DAO message "DAO(RPL-ROVR-RO)" 50: since the next RPL parent device (e.g., "N9") is not the root network device "ROOT" 12 (operation 76), the next RPL parent device can successively repeat operations 68, 70*b* (optional) and 70*c*, until the protected DAO message "DAO(RPL-ROVR-RO)" 50 reaches the root network device "ROOT" 12 via the successive parent RPL network devices "N5" and "N1".

In response to the device interface circuit 24 of the root network device "ROOT" 12 receiving in operation 72 and 76 the protected DAO message "DAO(RPL-ROVR-RO)" 50, the processor circuit 26 of the root network device "ROOT" 12 in operation 78 determines whether validation of the protected DAO message "DAO(RPL-ROVR-RO)" 50 is needed: as described previously, the processor circuit 26 of the root network device "ROOT" 12 can be configured for deciding in operation 78 that validation of the protected DAO message "DAO(RPL-ROVR-RO)" 50 is required only if the IPv6 address 60 specified in the RPL Target Option 58 is already registered in a child entry in the memory circuit 28 of the root network device "ROOT" 12 (alternatively, the processor circuit 26 can decide that validation is required for each and every received protected DAO message "DAO(RPL-ROVR-RO)" 50 from any child network device). Assuming no validation is needed, the processor circuit 26 of the root network device "ROOT" 12 in operation 80 can register the IPv6 address 60 specified in the Target field of the protected DAO message "DAO(RPL-ROVR-RO)" 50, the "ROVR" secure token 32, and the corresponding reachability information (e.g., link-local address, child IP attachment address, etc.) in a child entry in the memory circuit 28. The processor circuit 26 of the root network device "ROOT" 12 in operation 80 also can output a corresponding secured DAO acknowledgement message (DAO-ACK) 74 to its child network device "N1" having forwarded the protected DAO message "DAO(RPL-ROVR-RO)" 50 to the root network device "ROOT" 12.

Figure 6:
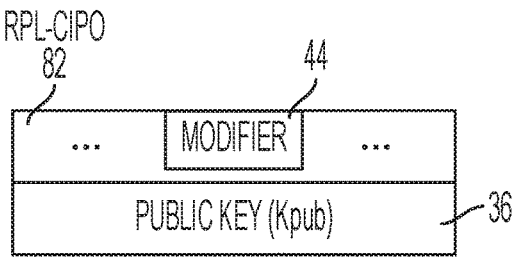
FIG. 6 illustrates an example RPL-based Crypto-ID parameters option (CIPO) (RPL-CIPO) comprising a modifier value and public key associated with generation of the secure token, according to an example embodiment.

Hence, the protected DAO message "DAO(RPL-ROVR-RO)" 50 generated and output by a RPL-enabled advertising network device "N13" 12 (or a RPL-enabled parent "N12" on behalf of a non-RPL enabled leaf node) is sent with the secure token 32 that is cryptographically generated by the advertising network device and associated with the target IP address 60 specified in the protected DAO message "DAO(RPL-ROVR-RO)" 50. If desired, the RPL-enabled advertising network device "N13" 12 also can add to the protected DAO message "DAO(RPL-ROVR-RO)" 50 a RPL-based Crypto-ID Parameters Option (RPL-CIPO) 82, illustrated in FIG. 6, that includes the modifier value "MODIFIER" 44 and the public key "Kpub" 36 used to generate the "ROVR" secure token 32; hence, the RPL-based Crypto-ID Parameters Option (RPL-CIPO) 82 attached to the protected DAO message "DAO(RPL-ROVR-RO)" 50 can enable each parent network device 12 (or at least the root network device "ROOT" 12) to at least initially validate the corresponding "ROVR" secure token 32 in the protected DAO message "DAO(RPL-ROVR-RO)" 50.

As noted previously and as illustrated in FIG. 1B, however, it is possible that an unauthorized/attacking network device "N14" 12 could detect the protected DAO message "DAO(RPL-ROVR-RO)" 50 and attempt to claim the target IP address 60 as its own by sending a "spoofed" DAO message 84 (or a spoofed "NS(EARO)" if a non-RPL device) that also includes the "ROVR" secure token 32 (and the RPL-based Crypto-ID Parameters Option (RPL-CIPO) 82) that was generated by the advertising network device "N13" 12 and not the unauthorized/attacking network device "N14" 12. The spoofed DAO message 84 could cause a RPL parent network device "N6" (e.g., unaware of the original protected DAO message "DAO(RPL-ROVR-RO)" 50) to output a corresponding secured DAO acknowledgement message 74 (if a RPL-enabled leaf network device, else a "NA(EARO)") and forward the spoofed DAO message 84 to its parent network device, for example the parent network device "N2" 12 and/or the parent network device "N5" 12.

As apparent from the foregoing, the parent network device "N2" 12 also would forward the spoofed DAO message 84 to the root network device "ROOT" 12, as the parent network device "N2" 12 also would be unaware of the original protected DAO message "DAO(RPL-ROVR-RO)" 50, causing the spoofed DAO message 84 to forwarded to any one of the parent network device "N5" (serving as common parent between the advertising network device "N13" 12 and the unauthorized/attacking network device "N14" 12) and/or the root network device "ROOT" 12.

According to the example embodiments, any parent network device in the DAG topology 14 (or at least the root network device "ROOT" 12), operating in storing mode or nonstoring mode, can be configured for requiring validation of any DAO message (e.g., in operations 68 or 78 of FIG. 3A) by selectively issuing a cryptographic challenge to the DAO message, for example in response to determining that the IPv6 address 60 is already registered or used in the data network 10, or in response to detecting a heightened security state (e.g., during network formation, heightened security alert, etc.).

The example embodiments can operate in storing mode, nonstoring mode, and/or a hybrid of storing mode and non-storing mode. Referring to FIG. 3B and FIG. 1C, the processor circuit 26 of a common parent (e.g., "N5" 12) (in storing mode) and/or the root network device "ROOT" 12 (e.g., if the DAG topology 14 is operating in nonstoring mode) in operation 86 can generate and output a cryptographic challenge 88 that must be completed by the advertising network device claiming ownership to the target IPv6 address 60 and the "ROVR" secure token 32. In particular, the common parent 12 and/or the root network device "ROOT" 12 can dynamically generate in operation 86b (for a RPL-enabled child network device) a DAO verification request (DAO-REQ) message 88 that specifies a dynamically-generated nonce value that challenges the advertising unauthorized/attacking network device "N14" 12 to cryptographically sign the nonce value in order to prove that the advertising unauthorized/attacking network device "N14" 12 owns the corresponding private key "Kprv" 34 associated with generating the "ROVR" secure token 32 that was in the protected DAO message "DAO(RPL-ROVR-RO)" 50. (If the child network device is non-RPL enabled, for example if both "N13" and "N14" are non-RPL child network devices that both attached to RPL parent "N12" operating in storing mode), the RPL parent "N12" could generate and output in operation 86a a Neighbor Advertisement challenge ("NA (EARO, STATUS=VALIDATION REQUESTED, NONCE) ") that includes a corresponding nonce value dynamically generated by the RPL parent "N12").

The processor circuit 26 of the common parent (e.g., "N5" 12) (in storing mode) and/or the root network device "ROOT" 12 (e.g., if the DAG topology 14 is operating in nonstoring mode) that initiates the DAO verification request (DAO-REQ) message 88 in operation 90 also can selectively set in its memory circuit 28 a corresponding child entry indicating the pending cryptographic challenge, for example based on storing in the child entry the target IPv6 address 60 and the "ROVR" secure token 32 specified in the received spoofed DAO message 84, the corresponding child reachability information, and a "VALIDATION REQUESTED" status to indicate that the advertising unauthorized/attacking network device "N14" 12 claiming ownership of the target IPv6 address 60 and the "ROVR" secure token 32 must validate its RPL-based Crypto-ID Parameters Option (RPL-CIPO) 82. The common parent (and/or root network device "ROOT" 12) initiating the DAO verification request (DAO-REQ) message 88 also can store in the child entry the corresponding nonce value that is specified in the DAO verification request (DAO-REQ) message 88: for example, the root network device "ROOT" 12 initiating the DAO verification request (DAO-REQ) message 88 can store in its child entry the corresponding root-generated nonce value "NONCE_ROOT"; if the common parent network device "N5" 12 (in storing mode) is the first network device to initiate the DAO verification request (DAO-REQ) message 88, the common parent network device "N5" 12 can store in its child entry the corresponding generated value "NONCE_N5" (each nonce value generated by a parent network device is used only once for validation to avoid a replay attack).

As illustrated in FIG. 1C, the common parent "N5" 12 (in storing mode) can generate and output the DAO verification request (DAO-REQ) message 88 to the child network device "N6" having sent the spoofed DAO message 84; the child network device "N6", in response to receiving the spoofed DAO message 84, also can create a temporary "VALIDATION REQUESTED" entry in its corresponding memory circuit 28, if desired, and forward the DAO verification request (DAO-REQ) message 88 to the advertising unauthorized/attacking network device "N14" 12 (assuming RPL-enabled). The child network device (e.g., "N6") also can add its own corresponding nonce (e.g., randomly generated "NONCE_N6") to the DAO verification request (DAO-REQ) message 88, store the corresponding nonce (e.g., "NONCE_N6") in the temporary "VALIDATION REQUESTED" entry, and output the updated DAO verification request (DAO-REQ) 88 (containing the corresponding nonce "NONCE_N6") to the next-hop child device. As apparent from the foregoing, each RPL child can add its own level of security by adding its own corresponding nonce to the DAO verification request (DAO-REQ) message 88, and updating its corresponding memory circuit 28 with a corresponding child entry specifying a temporary "VALIDATION REQUESTED" entry, along with the corresponding nonce ("NONCE_N6") added by the corresponding RPL child network device in response to the received DAO verification request (DAO_REQ) message prior to forwarding toward the advertising unauthorized/attacking network device "N14" 12. Hence, the DAO verification request (DAO-REQ) message 88 can include a number of nonces generated by parent network devices that must be processed by the advertising unauthorized/attacking network device "N14" 12, where each parent network device can add a corresponding nonce value to the DAO verification request (DAO-REQ) message 88. If the RPL child devices 12 do not add their own nonces such that the DAO verification request (DAO-REQ) message 88 contains only the common parent-initiated nonce (e.g., "NONCE_5" if generated by "N5" or "NONCE_ROOT" if generated by "ROOT", e.g. if the DAG topology 14 is operating in nonstoring mode) then each RPL child device 12 can add the common parent-initiated nonce to its child entry in order to attempt verification of any challenge response. In one embodiment, if the DAG topology 14 is operating in nonstoring mode then the DAO verification request (DAO-REQ) message 88 contains the root-initiated nonce "NONCE_ROOT" and no other nonces.

If the unauthorized/attacking network device "N14" 12 is not RPL-enabled (illustrated in FIG. 1D), the processor circuit 26 of the parent network device "N6" 12 at the edge of the DAG topology 14 in operation 92 can convert the DAO verification request (DAO-REQ) message 88 into a neighbor advertisement challenge ("NA(EARO, STATUS=VALIDATION REQUESTED, NONCE)") 94 that includes the nonce value generated by the common parent (e.g., "NONCE_N5", "NONCE_ROOT") having initiated the DAO verification request (DAO-REQ) message 88.

As described previously, the unauthorized/attacking network device "N14" 12 is unable to provide a valid response to the DAO verification request (DAO-REQ) message 88 because the unauthorized/attacking network device "N14" 12 does not own the private key "Kprv" 34 that was used to generate the "ROVR" secure token 32. In contrast, if the advertising network device "N13" 12 has actually moved from its initial parent network device "N12" to a new parent network device "N6" 12, the "moved" advertising network device "N13" 12 can generate a successful response to the DAO verification request (DAO-REQ) message 88 because the moved advertising network device "N13" 12 owns the private key "Kprv" 34 used to generate the "ROVR" secure token 32.

Hence, the moved advertising network device "N13" 12 (and/or the unauthorized/attacking network device "N14" 12) in operation 96 can generate a response to the cryptographic challenge 88 or 94 by signing the nonce(s) specified in the DAO verification request (DAO-REQ) message 88 or 94, and sending a challenge response back to the RPL parent "N6". In one embodiment, the moved advertising network device "N13" 12 (and/or the unauthorized/attacking network device "N14" 12) can generate a response based on adding its own nonce (e.g., "NONCE_LEAF") to the supplied nonce(s) resulting in a string of nonces, and then signing the string of nonces using its private key "Kprv" 34 to generate a signed string of nonces.

If the advertising network device "N13" 12 (and/or the unauthorized/attacking network device "N14" 12) is non-RPL enabled (as in FIG. 1E), the advertising network device "N13" 12 (and/or the unauthorized/attacking network device "N14" 12) generates and outputs in operation 96a the challenge response to the RPL parent "N6" in the form of a NS(EARO, CIPO, NDPSO, Nonce(s)) challenge response message 98 containing a corresponding CIPO field (with the modifier value "MODIFIER" 44 and public key "Kpub" 36 used to generate the "ROVR" secure token 32), the nonce value(s) (e.g., the string comprising the common parent-initiated nonce and its own nonce "NONCE_LEAF"), and a Neighbor Discovery Protocol Signature Option (NDPSO) that includes the signature that was generated based on cryptographically signing the string of nonce(s) using the corresponding private key "Kprv" 34: in other words, the advertising network device "N13" 12 would sign the string of nonce(s) using its corresponding private key "Kprv" 34, whereas the unauthorized/attacking network device "N14" 12 would sign the string of nonce(s) using its own corresponding and different private key "Kprv" 34. Additional details regarding generation of the NS(EARO, CIPO, NDPSO, Nonce) challenge response message 98 are described in the AP-ND Draft.

If the advertising network device "N13" 12 (and/or the unauthorized/attacking network device "N14" 12) is a RPL enabled device (as in FIG. 1F), the advertising network device "N13" 12 (and/or the unauthorized/attacking network device "N14" 12) generates and outputs in operation 96b the challenge response to the RPL parent "N6" in the form of a protected DAO with RPL Signature Option (RPLSO) message 100. The protected DAO with RPL Signature Option (RPLSO) message 100 contains a corresponding RPL-based Crypto-ID Parameters Option (RPL-CIPO) 82 (with the modifier value "MODIFIER" 44 and public key "Kpub" 36 used to generate the "ROVR" secure token 32), the string of nonces comprising the nonce value(s) specified in the DAO verification request (DAO-REQ) message 88 (and optionally its own corresponding nonce "NONCE_LEAF"), and a RPL Signature Option (RPLSO) that includes the signature that was generated based on cryptographically signing the string of nonce(s) using the corresponding private key "Kprv" 34: as described previously, the advertising network device "N13" 12 would sign the string of nonce(s) using its corresponding private key "Kprv" 34, whereas the unauthorized/attacking network device "N14" 12 would sign the string of nonce(s) using its own corresponding and different private key "Kprv" 34. As described previously, a RPL-enabled leaf device can receive a challenge request 88 comprising a string of nonces inserted by the common parent (e.g., "N5") and each child network device (e.g., "N6") such that the RPL-enabled leaf device can add to the string of nonces its own nonce (e.g., "NONCE_LEAF") prior to cryptographically signing the string of nonces (e.g., "NONCE_N5-NONCE_N6-NONCE_LEAF") resulting in a signed string of nonces. Hence, the signed string of nonces includes the cryptographic signature and the (unencrypted) string of nonces.

In response to the parent network device "N6" 12 receiving in operation 102 the challenge response (98 of FIG. 1E or 100 of FIG. 1F), the processor circuit 26 of the parent network device "N6" 12 in operation processes the challenge response, for example based on obtaining the public key "Kpub" 36 from the RPL-based Crypto-ID Parameters Option (RPL-CIPO) 82 or the CIPO field of the NS(EARO, CIPO, NDPSO, Nonce) challenge response message 98 (alternative methods can be used to obtain any public key "Kpub" 36 of a given network device 12, for example based on issuing request to a server (not shown) via the backbone router 22).

The processor circuit 26 of the parent network device "N6" 12 in operation 102 can attempt validation based on determining whether the public key "Kpub" 36 verifies the cryptographic signature relative to the signed string of nonces: if the public key "Kpub" 36 obtained by the parent network device "N6" 12 corresponds to the private key "Kprv" 34 used to generate the "ROVR" secure token 32 (as would be the case for the advertising network device "N13" 12), then the parent network device "N6" 12 should be able to use the public key "Kpub" 36 to verify the cryptographic signature is a valid signature of the signed string of nonces specified in the challenge response because the corresponding private key "Kprv" 34 was used to cryptographically sign the signed string of nonces; in contrast, if the public key "Kpub" 36 obtained by the parent network device "N6" does not correspond to the private key "Kprv" 34 used to generate the "ROVR" secure token 32 (as would be the case for the unauthorized/attacking network device "N14" 12), then the parent network device "N6" 12 would apply the public key "Kpub" 36 and determine the cryptographic signature is not a valid signature of the signed string of nonces because a different private key "Kprv" 34 (i.e., that of the unauthorized/attacking network device "N14" 12) was used to cryptographically sign the string of nonces, indicating the "ROVR" secure token 32 was generated by a different network device 12 having a different private key "Kprv" 34. As apparent from the foregoing, the processor circuit 26 of the parent network device "N6" also can provide additional security by providing its own nonce ("NONCE_N6") in the challenge request message 88, and verify its own nonce within the signed string of nonces.

Hence, the processor circuit 26 of the advertising network device (e.g., the moved advertising network device "N13")

12 can generate a signature based on applying the private key "Kprv" 34 to signing the string of nonces (e.g., "NONCE_ROOT-NONCE_N1-NONCE_N5-NONCE_N6-NONCE_N13"), and supply in the challenge response 100 the signed string of nonces comprising the signature and the (unencrypted) string of nonces (e.g., "NONCE_ROOT-NONCE_N5-NONCE_N5-NONCE_N6-NONCE_N13"). Hence, the parent network device "N6" 12 can determine whether the public key "Kpub" 36 validates the signature relative to the signed string of nonces (e.g., "NONCE_ROOT-NONCE_N1-NONCE_N5-NONCE_N6-NONCE_N13"), based on verifying its corresponding nonce "NONCE_N6" is in the signature. The string of nonces remain in the challenge response 100 to ensure each subsequent parent toward and including the root network device "ROOT" 12 can verify the signature based on the signed string of nonces (e.g., "NONCE_ROOT-NONCE_N1-NONCE_N5-NONCE_N6-NONCE_N13").

Hence, if in operation 102a the parent network device "N6" 12 determines that the challenge response fails (as would be the case if the challenge response was attempted by the unauthorized/attacking network device "N14" 12), the processor circuit 26 of the parent network device "N6" 12 in operation 102a can update the child entry status to "VALIDATION FAILED" and delete the entry from active use.

In contrast, if in operation 102b the parent network device "N6" 12 determines that the challenge response is successful, i.e., that the public key "Kpub" 36 verifies the signature of the signed string of nonces, then the parent network device "N6" 12 can verify the challenge response, and accordingly clear the status in its child entry by removing the "VALIDATION REQUESTED" status and clearing the stored timer. The parent network device "N6" 12 also can send in operation 102b a secured DAO acknowledgement message 74 to the validated RPL-aware advertising network device "N13" 12, or a "NA(EARO)" message to the validated non-RPL aware advertising network device "N13" 12. If the challenge response was a NS(EARO, CIPO, NDPSO, Nonce(s)) challenge response message 98 from a non-RPL aware leaf device, the parent network device in operation 102c also can convert the received NS(EARO, CIPO, NDPSO, Nonce(s)) challenge response message 98 into a protected DAO with RPL Signature Option (RPLSO) message 100 for forwarding to the next parent network device (e.g., the common parent "N5").

Regardless of success or failure, the processor circuit 26 of the parent network device "N6" 12 in operation 104 can forward the protected DAO with RPL Signature Option (RPLSO) message 100 (including the signed string of nonces) to its next-hop parent to enable each hop toward the path to the originator of the DAO verification request (DAO-REQ) message 88 to verify whether the challenge response was successful or failed.

Referring to FIG. 3C, the next RPL parent (e.g., in storing mode) in operation 106 can effectively repeat operations 102a or 102b, as appropriate, depending on whether the challenge response succeeds or fails based on the signed string of nonces in the received protected DAO with RPL Signature Option (RPLSO) message 100. If the next RPL parents can verify the received protected DAO with RPL Signature Option (RPLSO) message 100 is a valid response to the cryptographic challenge specified in the DAO verification request (DAO-REQ) message 88 (using the public key "Kpub" 36), the next RPL parents (e.g., "N5") can clear the status in its child entry by removing the "VALIDATION REQUESTED" status and clearing the stored timer.

Assuming the root network device "ROOT" 12 originated the DAO verification request (DAO-REQ) message 88, the RPL parents (e.g., "N6"-"N5"-"N1" and/or "N6"-"N2") can verify the signature and that their respective nonce(s) are in the signed string of nonces (if added into the challenge request message 88) and forward the protected DAO with RPL Signature Option (RPLSO) message 100 to the root network device "ROOT" 12, enabling the processor circuit 26 of the root network device "ROOT" 12 in operation 108 to effectively execute operations 102a or 102b, as appropriate, depending on whether the challenge response succeeds or fails based on the signed string of nonces in the received protected DAO with RPL Signature Option (RPLSO) message 100. If the processor circuit 26 of the root network device "ROOT" 12 can verify the received protected DAO with RPL Signature Option (RPLSO) message 100 is a valid response (e.g., by the advertising network device "N13" 12) to the cryptographic challenge specified in the DAO verification request (DAO-REQ) message 88, the root network device "ROOT" 12 can clear the status in its child entry by removing the "VALIDATION REQUESTED" status and clearing the stored timer, and storing at least the IPv6 address 60, the associated "ROVR" secure token 32, and reachability information for the advertising network device "N13" 12; the public key "Kpub" 36 of the advertising network device "N13" 12 also can be stored in the child entry, if desired. In contrast, if the processor circuit 26 of the root network device "ROOT" 12 determines the received protected DAO with RPL Signature Option (RPLSO) message 100 is not a valid response (e.g., by the unauthorized/attacking network device "N14" 12) to the cryptographic challenge specified in the DAO verification request (DAO-REQ) message 88, the processor circuit 26 of the root network device "ROOT" 12 in operation 108 can delete the child entry having the "ROVR" secure token 32 and the associated "VALIDATION REQUESTED" status. As apparent from the foregoing, the child entry also can be deleted by the root network device "ROOT" 12 and/or any parent RPL device operating in storing mode if the challenge response is not received before expiration of the timer value in the child entry (i.e., by the "timeout" value).

According to example embodiments, scalable protection of DAO message parameters such as a target IP address can be provided based on selectively issuing a cryptographic challenge that requires an advertising network device claiming the target IP address to provide a cryptographic response that proves the advertising network device owns a private key required to generate a secure token associated with the target IP address.

Figure 7:
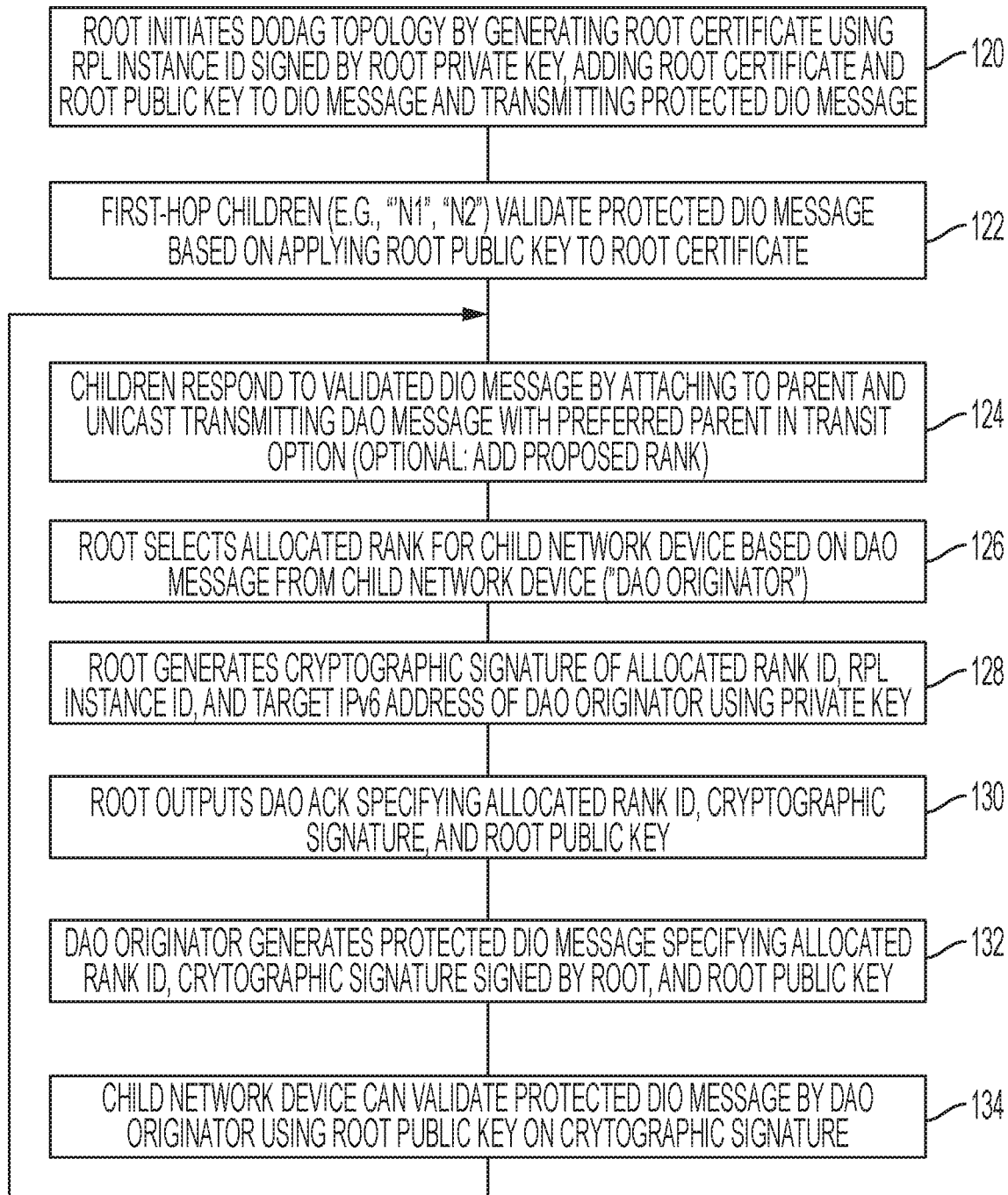
FIG. 7 illustrates a root network device executing generation of protected DODAG information object (DIO) messages having signed rank values, according to an example embodiment.

Generating Protected DODAG Information Object (DIO) Messages Having Signed Rank Values The RPL root network device 12 of FIGS. 1A-1F also can control in FIG. 7 generation of protected DODAG information object (DIO) messages based on generating cryptographic signatures of DIO parameters, according to an example embodiment. The RPL root network device 12 can generate a unique cryptographic signature for each DIO message that is transmitted in the RPL network, ensuring that no network device gaining link layer access to the RPL network can attack the RPL network by advertising an unauthorized rank.

In particular, each DIO message generated and output by the root network device "ROOT" 12 can include a certificate that is cryptographically signed by the root network device "ROOT" 12 using its corresponding private key "Kprv" 34: the processor circuit 26 of the root network device "ROOT" 12 in operation 120 can generate a root certificate based on cryptographically signing a RPL Instance identifier 54 (set by the root network device "ROOT" 12) with the corresponding private key "Kprv" 34 of the root network device "ROOT" 12; the root network device "ROOT" 12 can add to the root-initiated DIO message the root certificate and root public key "Kpub" 36, as well as any other required parameters as described in RFC 6550. The root network device "ROOT" 12 can output in operation 120 the root-initiated protected DIO message (comprising the root certificate and the corresponding public key "Kpub" 36 of the root network device "ROOT" 12) for creation of the DAG topology 14.

In response to first-hop network devices (e.g., "N1" and "N2" of FIG. 1A) 12 detecting the root-initiated protected DIO message, each of the first-hop network devices can validate in operation 122 the root certificate based on the corresponding public key "Kpub" 36. In one embodiment, the root certificate may be omitted from the DIO message transmitted in operation 120, in which case the first hop network devices can request the root certificate as part of a DODAG Information Solicitation (DIS)/DIO exchange between the first-hop network devices and the root network device "ROOT" 12.

In response to validating the root-initiated protected DIO message, a child network device (e.g., "N1" and "N2" of FIG. 1A) 12 in operation 124 can attach to the RPL parent (e.g., the root network device "ROOT" 12) and generate a DAO message that specifies the current RPL Instance identifier 54 and its corresponding parent in the DAO Transit Option: the child network device (i.e., the DAO originator) also can optionally insert into the DAO message a proposed rank to be used by the child network device in advertising its own DIO message.

The root network device "ROOT" 12 can respond to the received DAO message by selecting in operation 126 an allocated rank for the child network device (i.e., the DAO originator), for example based on whether the proposed rank is acceptable, or whether the root network device "ROOT" 12 determines an alternative rank should be advertised by the DAO originator. For example, the root network device "ROOT" 12 in operation 126 can allocate the proposed rank identification if it has a value greater than a corresponding parent rank identification; the root network device "ROOT" 12 also can reject the rank identification if the corresponding value is less than the corresponding parent rank identification, and allocate a different rank for the DAO originator.

The root network device "ROOT" 12 in operation 128 can generate a cryptographic signature of the allocated rank identification having been allocated by the root network device: the root network device "ROOT" 12 can use its private key "Kprv" 34 to create the cryptographic signature, based on signing a concatenated data structure comprising the allocated rank identification for DAO originator, the RPL Instance identifier 54, and the IPv6 address 60 specified in the RPL Target Option 58.

The root network device "ROOT" 12 in operation 130 can output (via unicast transmission to the DAO originator) a DAO acknowledgement message that specifies the allocated rank identification and the cryptographic signature (and optionally the public key "Kpub" 36 of the root network device "ROOT" 12). Hence, the DAO originator 12 can generate and output in operation 132 a new protected DIO message that includes the allocated rank identification that was allocated by the root network device "ROOT" 12, the cryptographic signature signed by the root network device "ROOT" 12, and the public key "Kpub" 36 of the root network device "ROOT" 12.

Hence, additional child network devices 12 in operation 134 can validate the new protected DIO message output by the DAO originator (e.g., "N1") based on the cryptographic signature and the root public key. Each child network device that receives a protected DIO message can validate the rank of the advertising parent associated with its address, using the public key in the certificate to validate the signature in the new option.

Each child network device joining the DAG topology 14 can recursively execute the operations of FIG. 7, ensuring that the root network device can generate a unique cryptographic signature for each DIO message transmitted by a DAO originator in the DAG topology 14. Further, the root network device "ROOT" 12 knows the rank of each network device that has already joined via transmission of its corresponding DAO message as described above.

Also note that the root network device "ROOT" 12 may allocate a different rank for different reasons, for example based on determining a depleted battery level (specified in an optional DAO field) relative to neighboring RPL network devices, in which case the root network device "ROOT" 12 may allocate an artificially high rank to discourage potential children from attaching to the DAO originator having the depleted battery level.

The root network device "ROOT" 12 also can form a new iteration of the DODAG by changing (incrementing) the RPL Instance identifier 54, requiring each network device 12 in the DAG topology 14 to revalidate its certificate with the root network device "ROOT" 12.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising: receiving, by a parent network device providing at least a portion of a directed acyclic graph (DAG) according to a prescribed routing protocol in a low power and lossy network, a destination advertisement object (DAO) message, the DAO message specifying a target Internet Protocol (IP) address claimed by an advertising network device in the DAG and the DAO message further specifying a secure token associated with the target IP address; and selectively issuing a cryptographic challenge in response to the DAO message to validate whether the advertising network device generated the secure token.

2. The method of claim 1, further comprising:
the parent network device storing a child entry specifying the target IP address, the secure token associated with the target IP address, and reachability information for reaching the target IP address; and
the parent network device selectively setting in the child entry, in response to issuing the cryptographic challenge, a validation requested status, a nonce value associated with the cryptographic challenge, and a timer.

3. The method of claim 2, further comprising the parent network device deleting the child entry if a valid response to the cryptographic challenge is not received prior to expiration of the corresponding timer.

4. The method of claim 1, wherein the selectively issuing a cryptographic challenge comprises:
generating a nonce value that challenges the advertising network device to cryptographically sign the nonce value to prove the advertising network device owns a private key associated with generating the secure token.

5. The method of claim 4, further comprising:
receiving a response to the cryptographic challenge that specifies a cryptographic data structure;
obtaining a public key associated with the private key that generated the secure token; and
selectively validating the response based on determining whether applying the public key to the cryptographic data structure verifies the nonce value was signed by the corresponding private key.

6. The method of claim 5, wherein the obtaining includes obtaining the public key from the response.

7. The method of claim 1, further comprising obtaining from the DAO message a public key associated with a private key that generated the secure token, and a modifier parameter used in generation of the secure token, for validation of the secure token.

8. The method of claim 1, wherein the parent network device is one of a root network device for the DAG topology, or a common parent that is attached within the DAG topology rooted by the root network device, the parent network device having received the DAO message from a first child device following reception of a second DAO message specifying the target IP address and having been received from a second child device different from the first child device.

9. An apparatus implemented as a physical machine, the apparatus comprising:
non-transitory machine readable media configured for storing executable machine readable code;
a device interface circuit configured for receiving a destination advertisement object (DAO) message in a low power and lossy network, the apparatus implemented as a parent network device providing at least a portion of a directed acyclic graph (DAG) according to a prescribed routing protocol in the low power and lossy network; and
a processor circuit configured for executing the machine readable code, and when executing the machine readable code operable for:
determining the DAO message specifies a target Internet Protocol (IP) address claimed by an advertising network device in the DAG, and that the DAO message further specifies a secure token associated with the target IP address; and
selectively issuing a cryptographic challenge in response to the DAO message to validate whether the advertising network device generated the secure token.

10. The apparatus of claim 9, wherein:
the processor circuit is configured for storing, in the non-transitory machine readable media, a child entry specifying the target IP address, the secure token associated with the target IP address, and reachability information for reaching the target IP address; and
the processor circuit configured for selectively setting in the child entry, in response to issuing the cryptographic challenge, a validation requested status, a nonce value associated with the cryptographic challenge, and a timer.

11. The apparatus of claim 10, wherein the processor circuit is configured for deleting the child entry if a valid response to the cryptographic challenge is not received prior to expiration of the corresponding timer.

12. The apparatus of claim 9, wherein the processor circuit is configured for selectively issuing a cryptographic challenge based on generating a nonce value that challenges the advertising network device to cryptographically sign the nonce value to prove the advertising network device owns a private key associated with generating the secure token.

13. The apparatus of claim 12, wherein:
the device interface circuit is configured for receiving a response to the cryptographic challenge that specifies a cryptographic data structure;
the processor circuit is configured for obtaining a public key associated with the private key that generated the secure token; and
the processor circuit is configured for selectively validating the response based on determining whether applying the public key to the cryptographic data structure verifies the nonce value was signed by the corresponding private key.

14. The apparatus of claim 13, wherein the processor circuit is configured for obtaining the public key from the response.

15. The apparatus of claim 9, wherein the processor circuit is configured for obtaining from the DAO message a public key associated with a private key that generated the secure token, and a modifier parameter used in generation of the secure token, for validation of the secure token.

16. The apparatus of claim 9, wherein the apparatus is one of a root network device for the DAG topology, or a common parent that is attached within the DAG topology rooted by the root network device, the parent network device having received the DAO message from a first child device following reception of a second DAO message specifying the target IP address and having been received from a second child device different from the first child device.

17. One or more non-transitory tangible media encoded with logic for execution by a machine and when executed by the machine operable for:
receiving, by the machine implemented as a parent network device providing at least a portion of a directed acyclic graph (DAG) according to a prescribed routing protocol in a low power and lossy network, a destination advertisement object (DAO) message, the DAO message specifying a target Internet Protocol (IP) address claimed by an advertising network device in the DAG and the DAO message further specifying a secure token associated with the target IP address; and
selectively issuing a cryptographic challenge in response to the DAO message to validate whether the advertising network device generated the secure token.

18. The one or more non-transitory tangible media of claim 17, further operable for:
storing a child entry specifying the target IP address, the secure token associated with the target IP address, and reachability information for reaching the target IP address; and
selectively setting in the child entry, in response to issuing the cryptographic challenge, a validation requested status, a nonce value associated with the cryptographic challenge, and a timer.

19. The one or more non-transitory tangible media of claim 17, wherein the selectively issuing a cryptographic challenge comprises:
generating a nonce value that challenges the advertising network device to cryptographically sign the nonce value to prove the advertising network device owns a private key associated with generating the secure token.

20. The one or more non-transitory tangible media of claim 17, further operable for obtaining from the DAO message a public key associated with a private key that generated the secure token, and a modifier parameter used in generation of the secure token, for validation of the secure token.

* * * * *